(12) United States Patent
Daniel

(10) Patent No.: US 8,059,089 B2
(45) Date of Patent: Nov. 15, 2011

(54) INPUT DEVICE AND METHOD, AND CHARACTER INPUT METHOD

(75) Inventor: Tyler Jon Daniel, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1042 days.

(21) Appl. No.: 11/597,478

(22) PCT Filed: May 25, 2004

(86) PCT No.: PCT/JP2004/007456
§ 371 (c)(1),
(2), (4) Date: Nov. 5, 2007

(87) PCT Pub. No.: WO2005/116802
PCT Pub. Date: Dec. 8, 2005

(65) Prior Publication Data
US 2011/0134034 A1   Jun. 9, 2011

(51) Int. Cl.
*G09G 5/00* (2006.01)
(52) U.S. Cl. ............ 345/156; 345/157; 345/158
(58) Field of Classification Search .......... 345/156–169
See application file for complete search history.

(56) References Cited

U.S. PATENT DOCUMENTS

| | | | | |
|---|---|---|---|---|
| 5,986,643 | A * | 11/1999 | Harvill et al. | 345/156 |
| 6,275,213 | B1 * | 8/2001 | Tremblay et al. | 345/156 |
| 7,283,120 | B2 * | 10/2007 | Grant | 345/156 |
| 2002/0109668 | A1 * | 8/2002 | Rosenberg et al. | 345/156 |
| 2002/0140680 | A1 * | 10/2002 | Lu | 345/169 |
| 2002/0180698 | A1 * | 12/2002 | Kaelbling | 345/156 |
| 2004/0174337 | A1 * | 9/2004 | Kubota et al. | 345/156 |

FOREIGN PATENT DOCUMENTS

| | | |
|---|---|---|
| JP | 61-148520 | 7/1986 |
| JP | 05-282095 | 10/1993 |
| JP | 06-102980 | 4/1994 |
| JP | 07-146751 | 6/1995 |
| JP | 7146751 A | 6/1995 |
| JP | 2001-242986 | 9/2001 |
| JP | 2001242986 A | 9/2001 |
| JP | 2002-366277 | 12/2002 |
| WO | 2004010370 A2 | 1/2004 |

OTHER PUBLICATIONS

International Search Report dated Aug. 24, 2004.
English language Abstracts of JP07-146751A; JP06-102980A; JP05-282095A; JP2001-242986A; and JP2002-366277A.
English translation of Japanese Office Action corresponding with Japanese Application No. 2006-513787, May 13, 2011.

* cited by examiner

*Primary Examiner* — Amare Mengistu
*Assistant Examiner* — Premal Patel
(74) *Attorney, Agent, or Firm* — Matthew B. Dernier, Esq.; Gibson & Dernier, LLP

(57) ABSTRACT

There is provided an input device capable of detecting a motion of a hand of a user (102) and suitable to perform input of digital data with. The input device (100) can be gripped by a hand of the user (102) and serves to input information to a given apparatus. The input device (100) includes: manipulation portions (112a to 112e) which can be bent by manipulation of the user (102); bend sensors (114a to 114e) for detecting bend amounts of the manipulation portions (112a to 112e); vibrators (120) for generating vibrations to be transmitted to the user (102); and a processor (118). The processor (118) generates vibration in the vibrator according to the information on the bend amounts of the manipulation portions (112a to 112e) detected by the bend sensors (114a to 114e).

12 Claims, 10 Drawing Sheets

(a)

(b)

INPUT DEVICE AND METHOD, AND CHARACTER INPUT METHOD

TECHNICAL FIELD

The present invention relates to an input device, for example, an input device with which an input is made to a given apparatus in accordance with a bend amount of a manipulation portion that can be bent when manipulated by a user.

BACKGROUND OF THE INVENTION

In the prior art, there have been various types of input devices including a joystick and a joypad. Data gloves are known as one of such the input devices.

A data glove receives a user's hand in its pouch-like main body to be used like a glove. For instance, when the data glove is used as an input device for a computer, an image simulating the user's hand is displayed in a virtual space shown on a display. As the user moves the hand wearing the data glove, the data glove inputs information according to the motion to the computer, and the image simulating the hand moves to follow the motion.

A usual means to enter characters is a keyboard. Cellular phones and the like typically employ numeric keypads in place of keyboards.

In the case where a game machine or the like uses a joypad or a joystick to enter characters in a character input area displayed on a display, a picture of a keyboard and a cursor are usually shown on a screen to receive a key input from a user. The user manipulates a four-way scroll key on the joypad or a stick of the joystick to place the cursor on a desired key of the keyboard displayed on the screen, and then presses a button on the joypad or the joystick, thereby determining the pointed key as a key having a desired character, thus the desired character is in the character input area.

In a data glove, a finger bend amount threshold is set for an action of pressing a button, for example. However, in a case where digital data is output when the finger bend amount exceeds the threshold, it is difficult for users to know the amount of finger bend necessary for triggering recognition of the press of a button.

Therefore, in the above-mentioned example, a motion that is perceived by the user as corresponding to the action of "pressing a button" may not trigger the data glove as the press of a button because the finger bend amount is not enough. Thoroughly bending and stretching the fingers can facilitate reliable recognition of the press of a button, but the excess finger movement amount imposes increasing burden on the user, tiring the user more. Also, it is desirable to minimize the finger movement amount when a quick input is needed.

Conventional input devices also have difficulties in meeting such a request that requires simultaneous digital data inputs from the user's five fingers. For instance, when a button is allocated to each of the user's five fingers and the five buttons are to be turned on all at once, it is very difficult for the user to know a finger bend amount that is enough to make the input device recognize that the button is turned on for each finger, and to bend the five fingers simultaneously until a bend amount enough for the recognition of turning on of the button is reached for each finger. In addition, it is difficult to carry out with accuracy such manipulation as bending specific three fingers out of five. Another difficulty in using data gloves and other similar devices is accomplishing a frequently repeated series of actions with a simple manipulation.

Moreover, having a pouch-like main body in which a user's hand is inserted while in use, a usual data glove tends to be large in size in order to accommodate such a main body. Also, since the data glove being constructed for use with the user's hand inserted therein, it takes a considerable amount of time for a user to pick up the data glove and insert his/her hand in the data glove. When a user is to wear data gloves on both hands, in particular, putting a data glove on one hand with the other hand, which is already wearing a data glove is difficult and requires a considerable amount of time. Wearing a data glove also makes it difficult to carry out such actions as manipulating a remote controller for TV and writing down information important to the course of the game that is shown on the display. Putting on and taking off a data glove are particularly cumbersome when the user removes the data glove before taking those actions and puts the data glove back on after finishing the actions.

Entering characters via a joystick, a joypad, or the like, on the other hand, requires a cumbersome, time-consuming manipulation which involves searching over a keyboard displayed on the screen for a desired key, placing the cursor exactly on the desired key, and then pressing the enter button.

It is therefore an object of the present invention to provide an input device and an input method that are easy for users to use.

Another object of the present invention is to provide an input device and an input method that are capable of detecting the motion of a user's hand and that are suitable for digital data input.

Still another object of the present invention is to provide an input device that can be gripped by a user while in use and that is suitable for digital data input.

Yet still another object of the present invention is to provide an input device that can quickly be made ready to use without requiring a cumbersome action such as insertion of a user's hand into a pouch-like main body.

Yet still another object of the present invention is to provide an input device that is more compact in size than conventional data gloves with pouch-like main bodies, and that is capable of detecting the motion of a user's hand.

Yet still another object of the present invention is to provide a character input method and an input device with which characters can easily be entered without the use of a keyboard or a numeric keypad.

SUMMARY OF THE INVENTION

The present invention provides an input device that is adapted to be gripped by a user for inputting information to a given apparatus including: a manipulation portion which can be manipulated and displaced, e.g., bendable or slidable, by the user; a sensor for detecting a displacement amount of the manipulation portion; a vibration means for generating vibrations that are transmitted to the user; and a control means which makes the vibration means generate vibrations in accordance with information indicative of the displacement amount of the manipulation portion detected by the sensor. When $v_1 \leq x \leq T_1$ is established or satisfied, where $T_1$ represents a first threshold and $v_1$ satisfies $0 \leq v_1 < T_1$, the control means makes the vibration means generate vibrations such that the vibrations become stronger as the displacement amount, x, increases.

Note that the control means may also be set to make the vibration means generate vibrations such that the vibrations become weaker as the displacement amount increases, when $T_1 \leq x < v_2$ is established, where x represents the displacement amount and $v_2$ satisfies $0 \leq T_1 < V_2$.

The present invention also provides an input device which can be gripped by a user, for inputting information to a given apparatus, including: a manipulation portion which can be manipulated and displaced by the user; a sensor for detecting a displacement amount of the manipulation portion; a vibration means for generating vibrations that are transmitted to the user; and a control means which makes the vibration means generate vibrations in accordance with information indicative of the displacement amount of the manipulation portion detected by the sensor. When the displacement amount in a range that is defined by $v_1 \leq x \leq v_2$ and near a first threshold $T_1$ is smaller than the first threshold $T_1$ ($v_1 \leq x < T_1$), where x represents the displacement amount, and $v_1$, $v_2$ and $T_1$ satisfies $0 \leq v_1 < T_1 < v_2$, the control means makes the vibration means generate vibrations such that the vibrations become stronger as the displacement amount increases; and when the displacement amount is larger than the first threshold $T_1$ ($T_1 < x \leq v_2$), the control means makes the vibration means generate vibrations such that the vibrations become weaker as the displacement amount increases.

Preferably, in a range near any of plural thresholds $T_1$, $T_2 \ldots T_k \ldots T_n$ ($2 \leq n$, $T_1 < T_2 \ldots < T_k \ldots < T_n$), the control means makes the vibration means generate vibrations such that the vibrations become stronger as the displacement amount increases if the displacement amount is smaller than the threshold, whereas the control means makes the vibration means generate vibrations such that the vibrations become weaker as the displacement amount increases if the displacement amount is larger than the threshold.

Preferably, plural manipulation portions having elasticity are placed where the user can grip the manipulation portions with his/her fingers, and the elasticity of the manipulation portions enables the user to hold the input device without dropping the input device by gripping those manipulation portions with his/her fingers.

The elasticity can be obtained by employing rubber or a similar material that itself is elastic. Alternatively, when a non-elastic material is employed, the input device can be held without being dropped if the input device is provided with hinged portions or similar movable portions that can be opened and closed, a spring is installed such that the bias of the spring keeps a state in which the hinged portions are open (i.e., a state in which a user's hand is open), and the user's fingers grip these manipulation portions, because of the elasticity of the manipulation portions.

Further, the control means may be set to make the vibration means generate vibrations such that vibrations generated near one of the thresholds $T_1$ to $T_n$ differ from vibrations generated near another of the thresholds $T_1$ to $T_n$, or such that when the displacement amount returns to the threshold from a value larger than the threshold, the control means makes the vibration means generate first vibrations which are different from vibrations generated near the threshold.

Still further, the control means may be set to make the vibration means generate second vibrations which are different from vibrations generated near the threshold, when the displacement amount reaches to the threshold from a value smaller than the threshold. The control means may also be one that detects a largest threshold that the displacement amount reaches while the displacement amount increases from a value smaller than the first threshold $T_1$ until exceeding the first threshold $T_1$ and then returns to this threshold $T_1$, and when the displacement amount returns to the threshold $T_1$, inputs the largest threshold to the given apparatus.

The input device of the present invention may be structured to include: means for detecting a displacement amount of the input device before and after the input device is moved through manipulation by the user; and a memory recording one or more commands that can be executed by the control means, in which the control means chooses and executes one or more commands recorded in the memory in accordance with the displacement amount detected by the means for detecting the displacement amount of the input device.

Further, there is provided an input device which can be gripped in a hand of a user, for inputting information to a given apparatus, including: plural manipulation portions positioned such that the user can grip the manipulation portions with his/her fingers, the manipulation portions having elasticity which enables the user to manipulate and bend the manipulation portions, and to hold the input device without dropping the input device by gripping the manipulation portions with his/her fingers; and a motion detection sensor for detecting a motion of a hand of the user, in which the information about a motion of the user's hand detected by the motion detection sensor is entered to the given apparatus. In addition, according to the present invention, there is also provided a method of inputting information about a motion of the user's hand to the given apparatus.

For example, a method of inputting information to a given apparatus via an input device is provided, in which the displacement amount of a movable portion of the input device is detected, a vibration corresponding to the detected displacement amount is transmitted to a user, and a larger displacement amount causes a stronger vibration to be transmitted when $v_1 \leq x \leq T_1$ is true, wherein x represents the displacement amount, T1 represents a first threshold, and $0 \leq v_1 < T_1$.

The present invention also provides a method of inputting information to a given apparatus through an input device, including: detecting a displacement amount of a movable portion of the input device and transmitting vibrations to a user in accordance with the detected displacement amount. When the displacement amount in a range that is defined by $v_1 \leq x \leq v_2$ and near a first threshold $T_1$ is smaller than the first threshold ($v_1 \leq x < T_1$), where x represents the displacement and amount, $v_1$, $v_2$ and $T_1$ satisfies $0 \leq v_1 < T_1 < v_2$, the vibrations are transmitted such that the vibrations become stronger as the displacement amount increases; and when the displacement amount is larger than the first threshold ($T_1 < x \leq v_2$), the vibrations are transmitted such that the vibrations become weaker as the displacement amount increases.

Further, there is also provided a method of inputting a character in a given character input area that is displayed on a display, including: detecting through a character input control unit an input made to the character input area by a user by displacing a movable portion of a character input device; and using the character input control unit to display, in the character input area, a character that is associated with the detected input, in which when a displacement amount of the movable portion does not exceed a given threshold, the character input control unit presents a candidate for a character to be entered to the user through the display and, when the displacement amount exceeds the given threshold, the character candidate is actually entered.

DETAILED DESCRIPTION OF THE INVENTION

An input device according to the present invention is extensively applicable as, for example, a key input device for computers, a controller for arcade machines/or and other game machines as well as for simulators, an input device for image processing devices, and/or a remote controller for TV, VCR and/or other electric appliances. There are no particular limitations to applications of the input device according to the present invention. The description given in this embodiment takes as an example a mode in which the input device according to the present invention is applied to a home video game machine.

This game machine executes, by way of a game program recorded in a disk such as a CD-ROM or a DVD-ROM, processing for drawing images of player characters, objects in the periphery of the player characters, and the like on a display device.

An input device according to this embodiment detects a user's hand, more specifically, finger actions including bending and stretching, and parallel movement, rotational movement, swiveling movement, and the like of the whole hand resulting from moving an arm. Detected data is sent to a machine or a device that receives an input from the input device.

Figure 1:
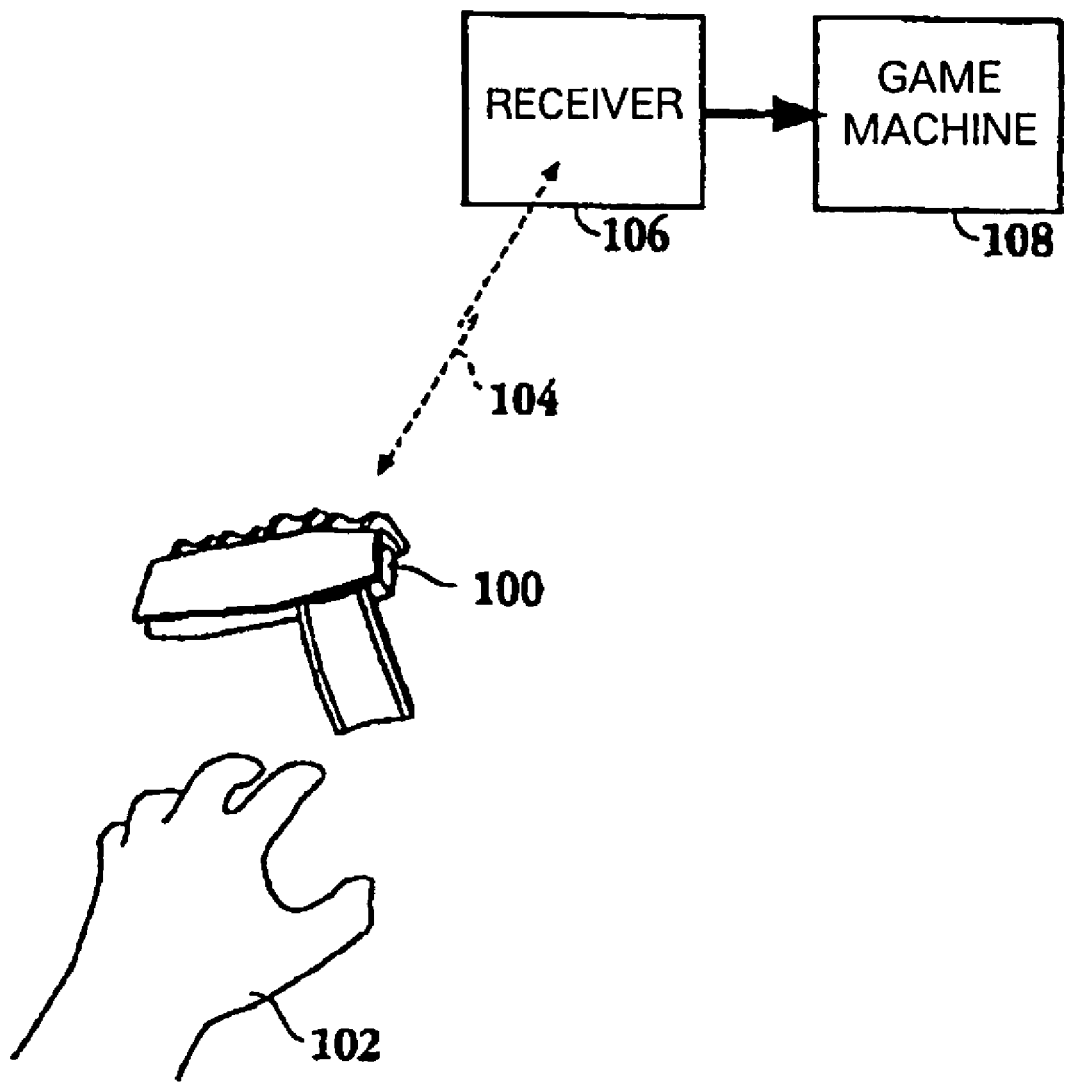
FIG. 1 is an explanatory diagram of an input device in use according to the present invention.

FIG. 1 shows an input device 100 in use according to this embodiment. As shown in FIG. 1, the input device 100 is gripped by a user denoted by a reference numeral 102 (only a hand of the user is shown in the drawing), and detects the overall movement of the hand and a bending action of each finger.

The input device 100 converts the thus detected motions into data that is recognizable to a game machine 108, and inputs the data to the game machine 108 through a receiver 106. This embodiment employs a configuration in which the input device 100 sends data to the receiver 106 by radio signals or other wireless communication devices (e.g., infrared). Alternatively, the input device 100 and the receiver 106 may be connected to each other by a cable or the like for wired data transmission. Any input method, whether it is wireless or wired, can be employed to input data from the input device 100 to the receiver 106. An arbitrary device to be controlled by the input device 100 is, in this embodiment, a game machine and is shown in FIG. 1 as the game machine 108.

A device for detecting the position and direction of the input device 100 is incorporated in the input device 100. In this embodiment, an acceleration sensor detects the position and direction of the input device 100. The acceleration sensor detects the acceleration after the input device 100 in the initial state is positioned through calibration or the like, to thereby obtain tilt angles of the input device 100 with respect to an x-axis, a y-axis and a z-axis, and detect a posture of the input device 100 from the tilt angles. When the obtained tilt angles fulfill given conditions, it is judged that the input device 100 is vertical, horizontal, flipped, or in other postures. An input from the input device may be made in accordance with the detected posture.

The input device 100 is provided with, as will be described later, manipulation portions as projections that can be bent separately by fingers and sensors for detecting the displacement amount, in this example, bend amount, of the manipulation portions, to thereby perform an input.

In this embodiment, the receiver 106 is attached to the game machine 108 and receives information entered from the input device 100, for example, input signals and commands, so that the input device 100 can be used in existing game machines and the like. However, it is also possible to incorporate a receiver in a game machine in advance. The receiver 106 in this embodiment receives data sent from the input device 100 and sends signals to the game machine 108 in a form recognizable to the game machine 108. For example, in the case of game machines that can recognize digital input through a four-way scroll key, a button, or the like, or analog input through an analog stick or the like, the receiver 106 inputs to the game machine 108 a digital input or analog input of information sent from the input device 100. In the following description of this embodiment, the receiver 106 receives input information from the input device 100 and, in response, enters a digital input of a four-way scroll key, a button, or the like to the game machine 108.

Figure 2:
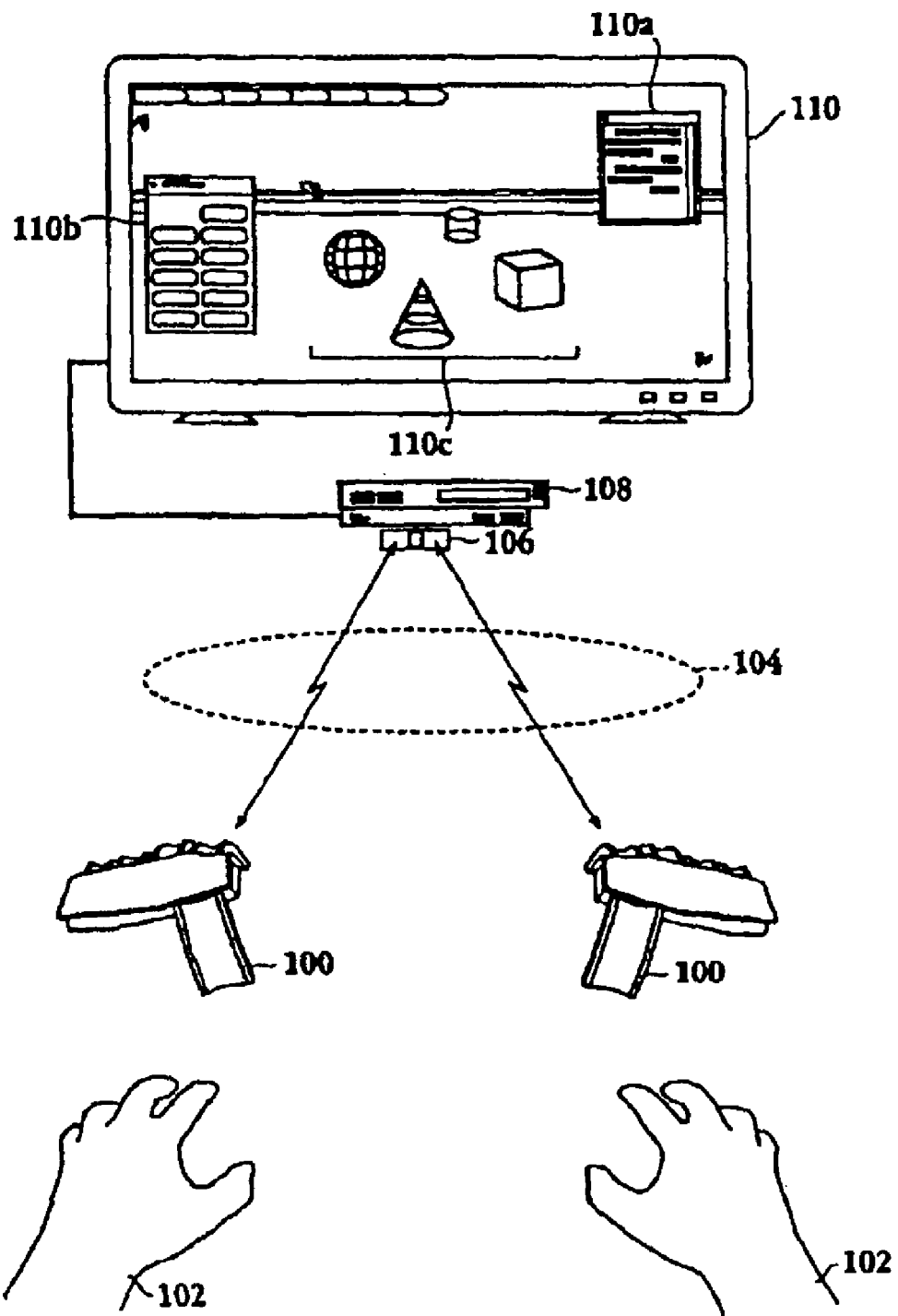
FIG. 2 is an explanatory diagram in which a receiver is attached to an input terminal of a game machine connected to a display.

FIG. 2 is an explanatory diagram in which the receiver 106 is attached to an input terminal of the game machine 108 connected to a display 110. This receiver 106 receives, from the input device 100 for the right hand and the input device 100 for the left hand, inputs created in accordance with motions of the hands of the user 102, and enters the received inputs to the game machine 108 as digital signals recognizable to the game machine 108. The game machine 108 executes a program such as a video game to display a screen on the display 110 in accordance with the digital input entered from the receiver 106. The display 110 displays a text 110a, a menu window 110b and/or a graphic 110c.

Figure 3:
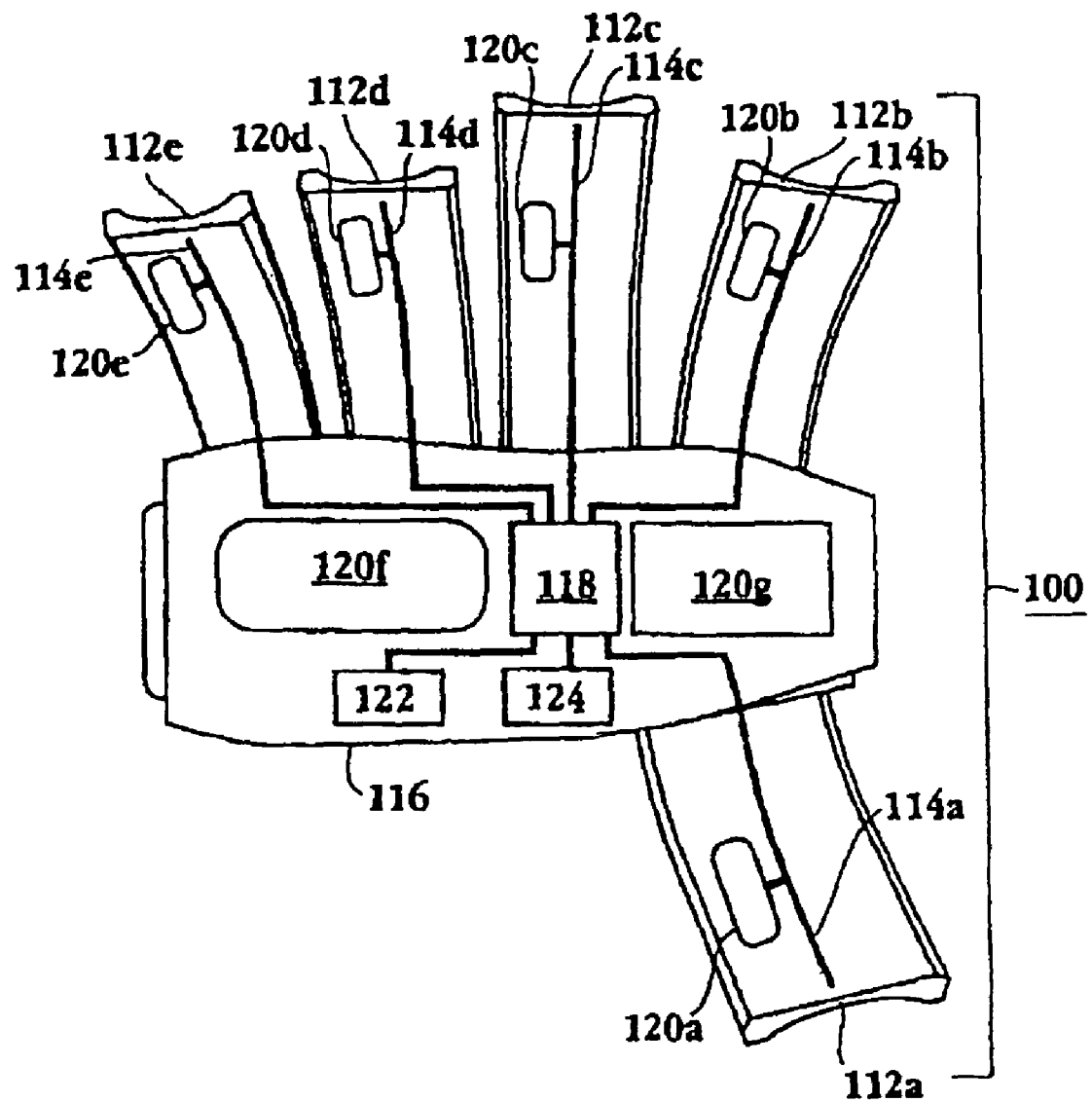
FIG. 3 is an explanatory diagram of the arrangement of sensors and others in the input device.

FIG. 3 is an explanatory diagram of the arrangement of the sensors and others in the input device 100 according to this embodiment. The input device 100 has a main body 116 and elastic manipulation portions 112a, 112b, 112c, 112d and 112e, which are provided in the main portion 116 and correspond to the user's thumb, forefinger, middle finger, third finger, and little finger, respectively. The main portion 116 is shaped to substantially fit in a palm, so that the user can easily grip the input device 100 without dropping the input device 100 accidentally. The manipulation portions 112a to 112e are provided with bend sensors 114a to 114e, respectively.

In this embodiment, the manipulation portions 112a to 112e have elasticity and the bend sensors 114a to 114e detect motions of the user's respective fingers, but there are other options. For example, at least one of the manipulation portions 112a to 112e may be constructed from a fixed member, which is fixed to the input device, and a movable member, which can be slid against the fixed member, so that a displacement amount (i.e., an amount of movement of the movable member in relation to the fixed member) is detected about this manipulation portion when the movable member is slid against the fixed member by the user's finger. The movable member may be freely slidable by the user's finger over the surface of the manipulation portion in all directions, and return to an initial position in a normal state where the user's finger is not in contact with the movable portion. In this case, a function equal to that of an analog stick can be obtained by outputting the displacement amount and displacement direction of the movable portion from the initial position. Alternatively, the manipulation portion 112 may constitute an analog joystick by axially supporting its end to the main body 116, so that motions of the user's respective fingers are detected by measuring the displacement amount from the initial state of the joystick.

The bend sensors 114a to 114e are coupled to a processor 118, which processes signals from the bend sensors 114a to 114e. The main body 116 also has an acceleration sensor 122 for detecting the acceleration in the x-axis, y-axis and z-axis directions. Signals from the acceleration sensor 122 too are processed by the processor 118. The main body 116 is further provided with a transmission unit 124 to transmit signals entered from the processor 118 to the receiver 106.

In this embodiment, bend amount thresholds are set respectively for the manipulation portions 112a to 112e and, when the processor 118 judges that a bend amount has changed from a value smaller than its threshold to a value larger than the threshold, or that a bend amount has changed from a value larger than its threshold to a value smaller than the threshold, the judgment result is entered in the game machine 108 via the receiver 106. The game machine 108 makes a game progress in accordance with the states of virtual buttons.

Details of the input device 100 are described below.

The input device 100 includes the elastic manipulation portions 112a to 112e having a shape and a material that allow the user's fingers to bend the manipulation portions 112a to 112e. The manipulation portions 112a to 112e in this embodiment are made of rubber, and substantially have a rectangular parallelepiped shape projecting from the main body 116. Grooves are formed in faces of the manipulation portions 112a to 112e that are gripped by the user (the faces are hereinafter referred to as external faces) so as to fit the user's respective fingers corresponding to the manipulation portions 112a to 112e, that is, to be adapted to the fingers. With the user's fingers respectively housed in the grooves in the manipulation portions 112a to 112e while the input device 100 is gripped by the user, the manipulation portions 112a to 112e fit more snugly to the fingers and more stable manipulation is accomplished than in a case where the external faces of the manipulation portions 112a to 112e are simply flat surfaces.

The manipulation portions 112a to 112e are stretched in a normal state where no pressure is being applied by the user's fingers. When pressure is applied by the fingers, the elasticity of the manipulation portions 112a to 112e provides a repulsive force with respect to the user's fingers in a direction of returning the manipulation portions 112a to 112e to the normal state. The input device 100 is held steadily due to friction between the operator's fingers and the manipulation portions 112a to 112e.

Figure 4:
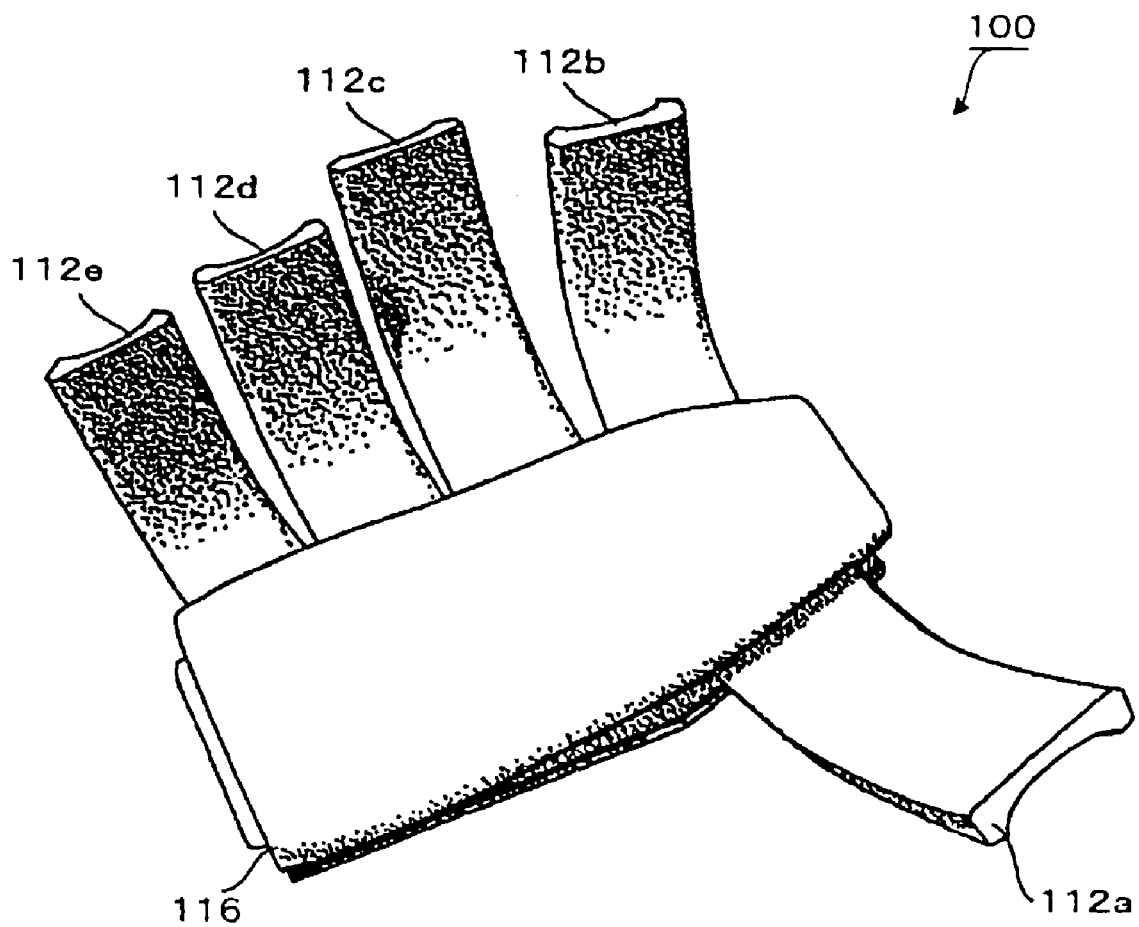
FIG. 4 is an explanatory diagram of the exterior of the input device.

As shown in FIGS. 3 and 4, the manipulation portions 112a to 112e of this embodiment in a normal state are curled inward to a certain degree when the external faces described above are the outside and the backs of the external faces are the inside. If the manipulation portions 112a to 112e are flat in the normal state, the user may have difficulty in holding the input device 100, thus increasing the risk of dropping the input device 100. This embodiment allows the user to grip the input device 100 with his/her fingers curled inward. Therefore, the input device 100 can be held steadily and is less likely to be dropped accidentally. However, in another embodiment, a securing element (e.g., a strap) may be used to secure the input device 100 to a user's hand such that the manipulation portions 112a to 112e may be flat in the normal state.

The bend sensors 114a to 114e are embedded in the manipulation portions 112a to 112e, respectively, in order to detect the degree of bending of the manipulation portions 112a to 112e. The bend sensors may be placed in the backs of the external faces (hereinafter these faces may be referred to as internal faces) if it suits the need or may be placed on the external face side if it does not hinder the user from gripping the input device 100.

The bend sensors 114a to 114e employed in this embodiment are linear pressure sensors having a resistance value that is varied depending on pressure. The resistance value of the pressure sensors is raised by pressure from the fingers when the manipulation portions 112a to 112e in the normal state are bent by the fingers. If a given voltage is applied to the pressure sensors to generate a current flow, the current flowing in the pressure sensors while the manipulation portions 112a to 112e are bent is smaller than the current flowing in the normal state by an amount depending on the degree of bending of the manipulation portions 112a to 112e. Accordingly, the degree of bending of the manipulation portions 112a to 112e can be detected from the current amount.

The manipulation portions 112a to 112e in this embodiment are provided with vibrators 120a to 120e, respectively, as shown in FIG. 3. In addition, a vibrator 120f is placed on the little finger side of the main body 116 and a vibrator 120g is placed on the thumb side. These vibrators enable the user to easily know the state of the manipulation portions, for example, the bend amount of respective manipulation portions. However, the input device 100 is capable of inputting data, for example, characters as will be described later, without the vibrators. The vibrators 120a to 120g, which are employed in this embodiment, may therefore be omitted.

The vibrators 120a to 120e are placed desirably in the vicinity of the front ends of the manipulation portions 112a to 112e, more desirably, near the user's fingertips.

The processor 118 receives outputs of the bend sensors 114a to 114e and the acceleration sensor 122, and processes the outputs. Output signals from the processor 118 are entered in the transmission unit 124. The transmission unit 124 sends the signals entered from the processor 118 to the receiver 106, which inputs the signals into the game machine 108. The game machine 108 can thus detect movement of the input device 100 and display game characters or an image simulating the user's hand in a manner that makes the images follow the actual hand motion of the user detected by the input device 100.

In this embodiment, the bend sensors 114a to 114e, the processor 118, the vibrators 120a to 120g, the acceleration sensor 122, the transmission unit 124 and other components are embedded in the manipulation portions 112a to 112e or the main body 116. The exterior of the input device 100 therefore conceals these components from the user's eyes as shown in an explanatory diagram of FIG. 4 which illustrates the exterior of the input device 100. Alternatively, the components may be placed in arbitrary places on a surface of the input device 100, or only some of the components may be embedded.

Figure 5:
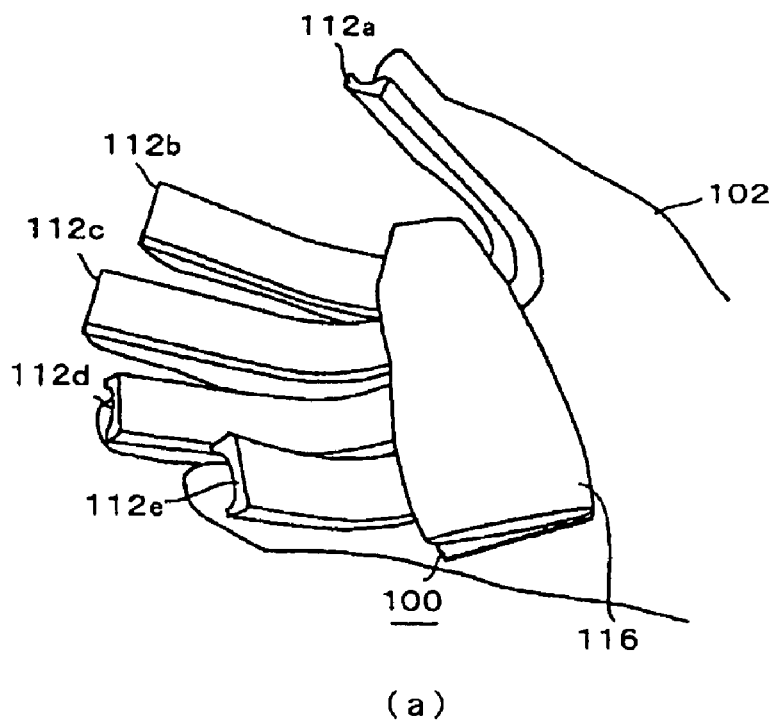
FIG. 5 is an explanatory diagram of the input device held in a light grip by a user, where part (a) shows the initial state of the input device, and part 5(b) shows the input device bent to the maximum bend amount.
Figure 5:
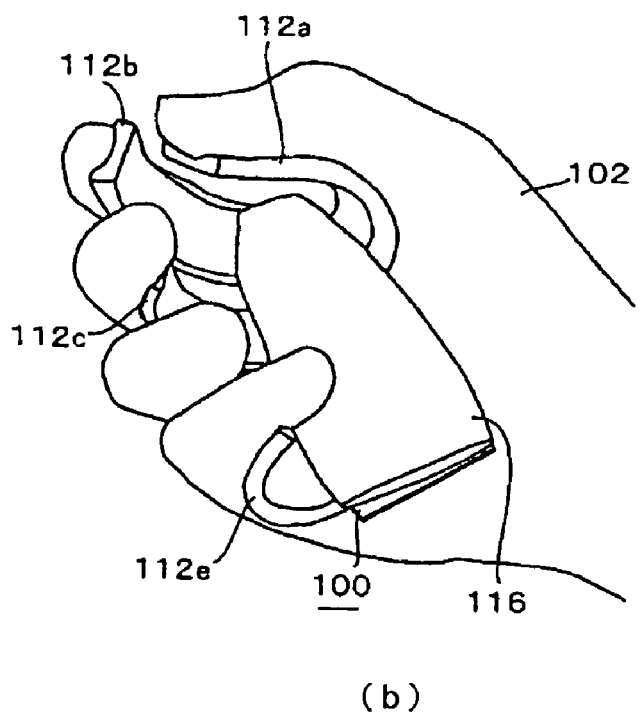

FIG. 5(a) shows the input device 100 held in a light grip by the user 102. This is the initial state of the input device 100 according to this embodiment in which the bend amount is 0 and no processing is being performed regarding the input state of a button. In this state, the main body 116 is contained in the palm of the user 102 and the manipulation portions 112a to 112e fit the thumb, the forefinger, the middle finger, the third finger, and the little finger, respectively.

FIG. 5(b) shows the input device bent by the user 102 until a maximum bend amount is reached. In this state, whereas the main body 116 is kept in the palm of the user 102 and is not moved from the position shown in FIG. 5(a), the manipulation portions 112a to 112e have reached a maximum bend amount, 100. The input device 100 may have an engaging mechanism, if it suits the need, so that the bend amount of the manipulation portions 112a to 112e can be kept at the maximum level. With the manipulation portions 112a to 112e bent, the input device 100 forms a substantially cylindrical shape which is more compact and easier to carry than in the normal state where the manipulation portions 112a to 112e are stretched as in FIG. 5(a).

Described next are details of processing in the input device 100.

When in use, the input device 100 lets a current flow from a power source (not shown) which is provided in the input device 100 into the bend sensors 114a to 114e. In this embodiment, the power source is built into the input device 100 to improve the portability of the input device 100. Alternatively, the input device 100 may receive external power supply. The processor 118 respectively detects currents flowing in the bend sensors 114a to 114e to detect the bend amounts of the manipulation portions 112a to 112e from the current values.

The resistance value of the bend sensors 114a to 114e is lowest in the normal state where the input device 100 is not in the grip of the user 102, and rises as the bend sensors are bent by the user 102.

In this embodiment, the bend amount is defined as follows, wherein the bend amount 0 (i.e., the minimum bend amount) represents the normal state of the bend sensors, the bend amount 100 (i.e., the maximum bend amount) represents a state in which the bend sensors are bent as much as possible, the current value in the normal state (i.e., the maximum current value) is given as $I_1$, the current value of when the bend sensors are bent to the maximum (i.e., the minimum current value) is given as $I_2$, and a measured current value is given as i.

Bend amount=$100(I_1-i)/(I_1-I_2)$

The definition makes it possible to detect, from the values of currents flowing in the bend sensors, how much the manipulation portions 112a to 112e of the input device 100 are bent. The bend amount and the current have a linear relation in this embodiment to simplify the explanation. However, the bend amount and the current may have a non-linear relation or other suitable relations, and the bend amount can be defined arbitrarily. Instead of the bend amount, the bend rate may be defined such that the bend rate 0% represents the normal state and the bend rate 100% represents the state of the maximum bend amount.

In this embodiment, a threshold is set to the bend amount detected by each of the bend sensors 114a to 114e, and the processor 118 detects that the bend amount has reached the threshold from a value smaller than the threshold and that the bend amount has returned to a value smaller than the threshold from a value larger than the threshold.

To be more specific, plural bend amount thresholds are set for each of the manipulation portions 112a to 112e. The processor 118 detects crossing of a bend amount threshold, namely, a phenomenon in which the bend amount increases from a value smaller than its threshold until the threshold is exceeded (hereinafter referred to as forward crossing) and a phenomenon in which the bend amount decreases from a value larger than its threshold and becomes smaller than the threshold (hereinafter referred to as reverse crossing).

The following description takes the manipulation portion 112a as an example, and describes a bend amount obtained from the value of a current flowing in the bend sensor 114a and processing executed in the processor 118 in accordance with the bend amount. Similar processing is performed on the rest of the manipulation portions 112b to 112e.

Figure 6:
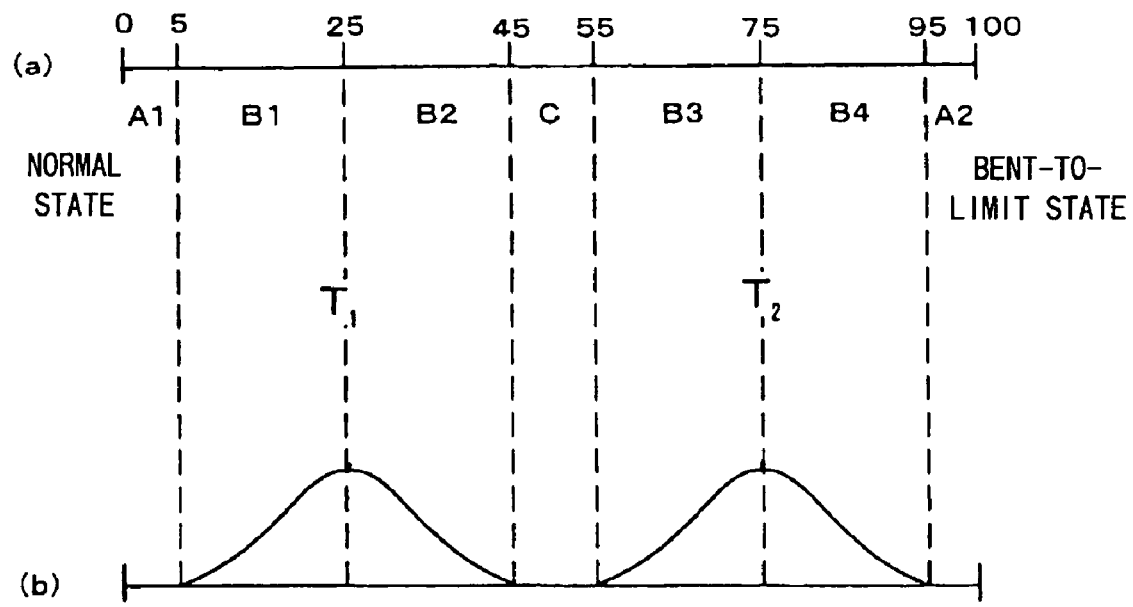
FIG. 6 (a) is a graph of the manipulation portion bend amount and FIG. 6 (b) is a graph showing the vibration intensity in relation to the bend amount.

FIG. 6(a) shows a graph of the bend amount of the manipulation portion 112a. In the drawing, the horizontal axis indicates the bend amount of the manipulation portion 112a, and the processor 118 performs given processing such as sending information to the game machine 108 and driving the vibrators 120a to 120g, depending on the range of the bend amount.

In the drawing, buffer areas (indicated by A1 and A2 in the drawing), trigger points (indicated by T1 and T2 in the drawing), vibration feedback areas (indicated by B1 to B4 in the drawing), and a vibration stopping area (indicated by C in the drawing) are defined. How the processor 118 operates in the respective areas will be described.

The area A1, where $0 \leq x < 5$ is satisfied with x representing the bend amount, corresponds to one of the buffer areas mentioned above. The vibrators 120a to 120g are not driven by the processor. This area corresponds to a state in which the input device 100 is held in a light grip by the user 102 and, in this area, the processor 118 determines the bend amount but does not provide an input to the game machine 108 and does not drive the vibrator 120a in the manipulation portion 112a. One of skill in the art will appreciate, however, that the processor may be configured to provide an input to the game machine 108 and to drive the vibrator 120a or other vibrators 120a to 120g, as the case may be, in different embodiments with different demands and/or desired capabilities.

The areas B1 and B2, where the bend amount x satisfies $5 \leq x \leq 25$ and $25 < x \leq 45$, respectively, correspond to the vibration feedback areas mentioned above. In these areas, the vibration of the vibrator 120a becomes stronger as the bend amount x increases after reaching 5, and reaches the maximum when the bend amount is 25. The vibration of the vibrator 120a becomes weaker as the bend amount increases after exceeding 25, and stops when the bend amount is 45.

Therefore, in this embodiment, when the bend amount x is in areas near the threshold $T_1$ which are defined by $v_1 \leq x \leq v_2$ when $v_1=5$ and $v_2=25$, the vibration becomes stronger as the bend amount increases in the area B1 where the bend amount x is equal to or smaller than the threshold $T_1$ ($v_1 \leq x \leq T_1$), and the vibration becomes weaker in a range where the bend amount is larger than the threshold $T_1$ ($T_1 < x \leq v_2$).

The processor 118 in this embodiment controls the vibrator 120a in accordance with the bend amount so that the vibrator 120a vibrates in the manner described above. In this embodiment, the level of vibration is expressed as the amplitude of the manipulation portion 112a. The level of vibration may be expressed in other forms, for example, one in which the amplitude is fixed while the vibration interval is shortened, or one in which the vibration interval (the frequency of vibration) is combined with the amplitude.

A point in FIG. 6(a) that is indicated by $T_1$ and where the bend amount x is 25 is a threshold for determining the forward crossing and the reverse crossing described above.

Preferably, when judging that the forward crossing of the threshold $T_1$ has been made as described above, the processor 118 controls the vibrator 120a to generate vibrations that indicate the occurrence of the forward crossing of the threshold $T_1$ (hereinafter referred to as $T_1$ forward crossing vibrations). The $T_1$ forward crossing vibrations in this embodiment are generated separately from the vibrations according to the bend amount in the areas B1 and B2 of FIG. 6(a), and then overlapped with the vibrations according to the bend amount in the areas B1 and B2. Alternatively, the vibrations according to the bend amount may be stopped while the $T_1$ forward crossing vibrations are generated. In this case, the vibrations according to the bend amount are brought back by, for example, stopping the $T_1$ forward crossing vibrations after the given time passes since the occurrence of the $T_1$ forward crossing.

The $T_1$ forward crossing vibrations are preferably distinguishable from the vibrations in the areas B1 and B2. For instance, the $T_1$ forward crossing vibrations are made different from the vibrations in the areas B1 and B2 in at least one of the aspects including amplitude, magnitude, vibration direction, and vibration frequency. The $T_1$ forward crossing vibrations in this embodiment have a shorter vibration interval (a higher frequency) than the vibrations in the areas B1 and B2, thereby enabling the user 102 to differentiate the two types of vibrations from each other.

The processor 118 judges that reverse crossing of the threshold $T_1$ has happened when the bend amount x decreases from a value larger than 25 and becomes smaller than $T_1$.

Preferably, when judging that reverse crossing of the threshold $T_1$ has been made as described above, the processor 118 controls the vibrator 120a to generate vibrations that indicate the occurrence of reverse crossing of the threshold $T_1$ (hereinafter referred to as $T_1$ reverse crossing vibrations). The $T_1$ reverse crossing vibrations in this embodiment are generated separately from the vibrations according to the bend amount in the areas B1 and B2 of FIG. 6(a), and then overlapped with the vibrations according to the bend amount in the areas B1 and B2. Alternatively, the vibrations according to the bend amount may be stopped while the $T_1$ reverse crossing vibrations are generated. In this case, the vibrations according to the bend amount are brought back by, for example, stopping the $T_1$ reverse crossing vibrations after the given time passes since the occurrence of the $T_1$ reverse crossing.

The $T_1$ reverse crossing vibrations are preferably distinguishable from the vibrations in the areas B1 and B2. For instance, the $T_1$ reverse crossing vibrations are made different from the vibrations in the areas B1 and B2 in at least one of the aspects including amplitude, magnitude, vibration direction, and vibration frequency. The $T_1$ reverse crossing vibrations may be identical with the $T_1$ forward crossing vibrations, or may be distinguishable from the $T_1$ forward crossing vibrations. In this embodiment, when $T_1$ reverse crossing occurs, the processor 118 controls the vibrator 120a to generate vibrations having an even shorter vibration interval (higher frequency) than the $T_1$ forward crossing vibrations as $T_1$ reverse crossing vibrations, so that the $T_1$ reverse crossing vibrations are differentiable from both the vibrations in the areas B1 and B2 and the $T_1$ forward crossing vibrations.

The area C, where the bend amount x satisfies 45<x<55, corresponds to the vibration stopping area mentioned above. In the area C, no vibrations are generated irrespective of the bend amount as in the areas A1 and A2, which are the buffer areas.

The areas B3 and B4, where the bend amount x satisfies $55 \leq x \leq 75$ and $75 < x \leq 95$, respectively, correspond to the vibration feedback areas mentioned above. When the bend amount is equal to or larger than 55, the processor 118 inputs a drive signal to the vibrator 120a to vibrate the manipulation portion 112a.

In this case, the processor 118 controls the vibrator 120a such that the vibration amplitude becomes larger as the bend amount increases and reaches the maximum level when the bend amount is 75. After the bend amount exceeds 75, the processor 118 controls the vibrator 120a such that the vibration becomes weaker as the bend amount increases and is ceased when the bend amount is 95.

In short, in this embodiment, the relation between the bend amount and the vibration is as follows when the bend amount x is in areas near a threshold $T_2$ which are defined by $v_3 \leq x \leq v_4$ and when $v_3 = 55$ and $v_4 = 95$. The vibration becomes stronger as the bend amount increases in the area B1 where the bend amount x is smaller than the threshold $T_2$ ($v_3 \leq x \leq T_2$), and the vibration becomes weaker in a range where the bend amount x is larger than the threshold $T_1$ ($T_2 < x \leq v_4$).

The vibrations in the areas B3 and B4 may be identical with or different from the vibrations in the areas B1 and B2. The vibrations in the areas B3 and B4 in this embodiment differ from those in the areas B1 and B2, so that the user 102 can readily recognize whether the present bend amount is in the area B1 or B2 or in the area B3 or B4.

A point in FIG. 6(a) that is indicated by $T_2$ and where the bend amount x is 75 is a threshold for determining the forward crossing and reverse crossing described above.

Preferably, when judging that forward crossing of the threshold $T_2$ has been made, the processor 118 controls the vibrator 120a to generate vibrations that indicate the occurrence of forward crossing of the threshold $T_2$ (hereinafter referred to as $T_2$ forward crossing vibrations). The $T_2$ forward crossing vibrations in this embodiment are generated separately from the vibrations according to the bend amount in the areas B3 and B4 of FIG. 6(a), and then overlapped with the vibrations according to the bend amount in the areas B3 and B4. Alternatively, the vibrations according to the bend amount may be stopped while the $T_2$ forward crossing vibrations are generated. In this case, the vibrations according to the bend amount are brought back by, for example, stopping the $T_2$ forward crossing vibrations after the given time passes since the occurrence of the $T_2$ forward crossing.

The $T_2$ forward crossing vibrations are preferably distinguishable from the vibrations in the areas B3 and B4 and from the $T_1$ forward crossing vibrations. For instance, the $T_2$ forward crossing vibrations are made different from the vibrations in the areas B3 and B4 and from the $T_1$ forward crossing vibrations in at least one of the aspects including amplitude, magnitude, vibration direction, and vibration frequency. The $T_2$ forward crossing vibrations in this embodiment have a shorter vibration interval (i.e., a higher frequency) than the vibrations in the areas B3 and B4, the $T_1$ forward crossing vibrations, and the $T_1$ reverse crossing vibrations, thereby enabling the user 102 to differentiate the vibrations from one another.

The processor judges that reverse crossing of the threshold $T_2$ has occurred when the bend amount x decreases from a value larger than 75 and becomes smaller than $T_2$.

Preferably, when judging that reverse crossing of the threshold $T_2$ has been made, the processor 118 controls the vibrator 120a to generate vibrations that indicate the occurrence of reverse crossing of the threshold $T_2$ (hereinafter referred to as $T_2$ reverse crossing vibrations). The $T_2$ reverse crossing vibrations in this embodiment are generated separately from the vibrations according to the bend amount in the areas B3 and B4 of FIG. 6(a), and then overlapped with the vibrations according to the bend amount in the areas B3 and B4. Alternatively, the vibrations according to the bend amount may be stopped while the $T_2$ reverse crossing vibrations are generated. In this case, the vibrations according to the bend amount are brought back by, for example, stopping the $T_2$ reverse crossing vibrations after the given time passes since the occurrence of the $T_2$ reverse crossing.

The $T_2$ reverse crossing vibrations are preferably distinguishable from the vibrations in the areas B3 and B4, the $T_1$ forward crossing vibrations, and the $T_1$ reverse crossing vibrations. For instance, the $T_2$ reverse crossing vibrations are made different from the vibrations in the areas B3 and B4, the $T_1$ forward crossing vibrations, and the $T_1$ reverse crossing vibrations in at least one of the aspects including amplitude, magnitude, vibration direction, and vibration frequency. The $T_2$ reverse crossing vibrations may be identical with the $T_2$ forward crossing vibrations, or may be different from the $T_2$ forward crossing vibrations to be distinguishable from the $T_2$ forward crossing vibrations.

In this embodiment, when judging that $T_2$ reverse crossing occurs, the processor 118 controls the vibrator 120a to generate vibrations having an even shorter vibration interval (i.e., higher frequency) than the $T_2$ forward crossing vibrations as $T_2$ reverse crossing vibrations. This makes the $T_2$ reverse crossing vibrations differentiable from any of the vibrations in the areas B1 and B2, the $T_1$ forward crossing vibrations, the $T_1$ reverse crossing vibrations, and the $T_2$ forward crossing vibrations.

The $T_1$ forward crossing vibrations, the $T_1$ reverse crossing vibrations, the $T_2$ forward crossing vibrations, and the $T_2$ reverse crossing vibrations in this embodiment are thus given different frequencies from one another, so that the present bend amount is recognized from the frequency of the vibration of the manipulation portion 112a.

The area A2, where the bend amount x satisfies 95<x<100, corresponds to the other of the buffer areas mentioned above. The processor 118 does not perform processing such as driving the vibrators 120a to 120g. This area corresponds to a state in which the input device 100 is held in a tight grip by the user 102 and, in this area, the processor 118 performs none of processing including an input to the game machine 108 and driving of the vibrator 120a which is placed in the manipulation portion 112a although one of skill in the art will appreciate that the processor 118 may be configured to carry out one or more of those processes depending on the needs of the specific application.

A description will be given below with reference to flow charts of FIGS. 7 and 8 about the relation between the bend amount of the manipulation portion 112a and the vibration of the vibrator 120a in the input device 100 structured as described above. In the following description, S is an abbreviation for step. The detection of the bend amount x, vibration control of the vibrator 120a, and the like are performed by the processor 118 unless otherwise stated.

Figure 7:
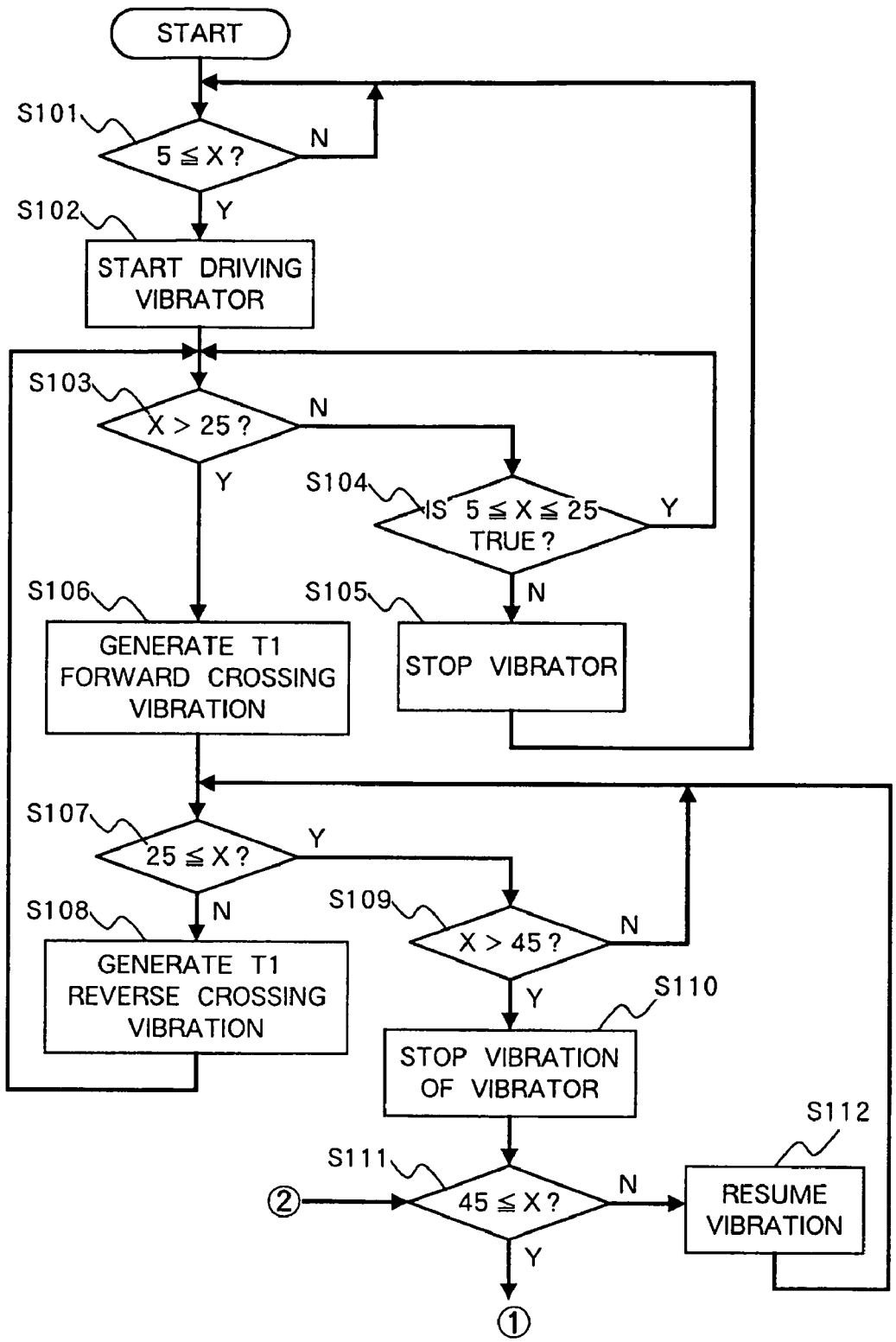
FIG. 7 is a flow chart illustrating the relation between the manipulation portion bend amount and the vibration of a vibrator in the input device.
Figure 8:
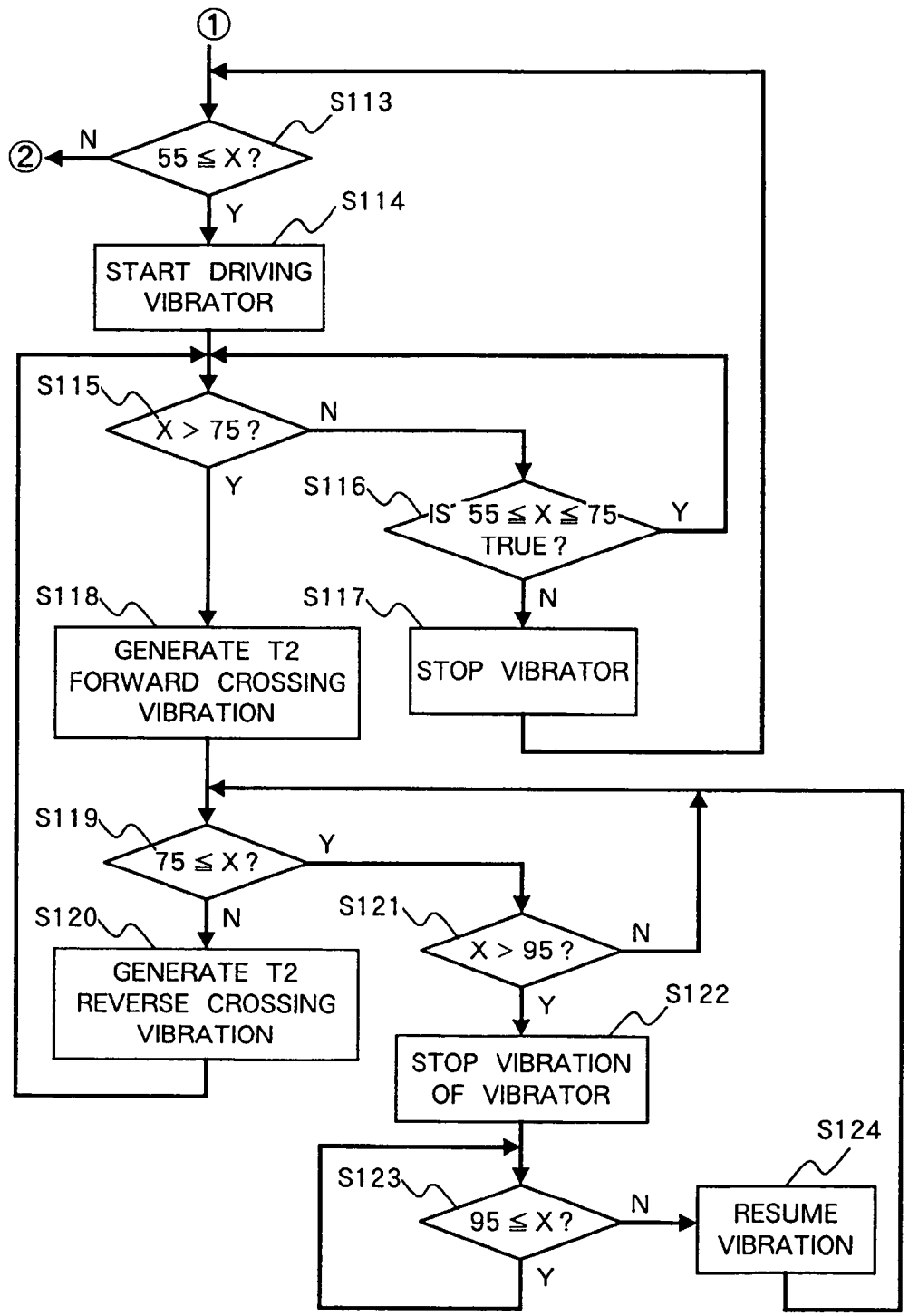
FIG. 8 is a flow chart illustrating the relation between the manipulation portion bend amount and the vibration of the vibrator in the input device.

As shown in the flow chart of FIG. 7, when the user 102 lightly grips the input device 100 and bends the manipulation portion 112a, the processor 118 detects the bend amount x and judges whether or not $5 \leq x$ is satisfied (S101). When $5 \leq x$ is not satisfied (S101: N), S101 is repeated. When $5 \leq x$ is satisfied (S101: Y), driving of the vibrator 120a is started (S102). As described above, the vibration of the vibrator 120a is controlled such that the vibration becomes stronger as x increases until x reaches 25. After x exceeds 25, the vibration becomes weaker as x increases and is ceased when x is 45.

Whether the bend amount x has exceeded 25 or not is judged after $5 \leq x$ is satisfied and the vibration is started (S103). When the answer is "no" (S103: N), whether or not x satisfies $5 \leq x \leq 25$ is judged (S104). When $5 \leq x \leq 25$ is satisfied (S104: Y), S103 is repeated. When the answer to S104 is "no" (S104: N), x is not within the range $5 \leq x \leq 25$ and not larger than 25. In short, x must not have a value that is equal to or larger than 5. It is therefore judged that x<5 is reached, and the processor 118 controls the vibrator 120a to stop the vibration (S105) before returning to S101.

When it is judged in S103 that x is larger than 25 (S103: Y), the vibrator 120a, controlled by the processor 118, generates $T_1$ forward crossing vibrations (S106). Whether or not x satisfies $25 \leq x$ is judged next (S107) and, when the answer is N (S107: N), the vibrator 120a, controlled by the processor 118, generates the $T_1$ reverse crossing vibrations (S108). The processing then returns to S103.

When it is judged in S107 that $25 \leq x$ is satisfied (S107: Y), whether x has reached 45 or not is judged (S109). When x has not reached 45 (S109: N), the processing returns to S107. When x has reached 45 (S109: Y), the vibration of the vibrator 120a is stopped (S110).

Whether or not x satisfies $45 \leq x$ is judged next (S111) and, when $45 \leq x$ is not satisfied (S111: N), the vibration is resumed (S112) before the processing returns to S107. When it is judged in S111 that $45 \leq x$ is satisfied (S111: Y), the processing proceeds to S113 in the flow chart of FIG. 8 in order to judge whether x satisfies $55 \leq x$ or not. When $55 \leq x$ is not satisfied (S113: N), the processing returns to S111.

When $55 \leq x$ is satisfied (S113: Y), driving of the vibrator 120a is started (S114). As described above, the vibration of the vibrator 120a is controlled such that the vibration becomes stronger as x increases until x reaches 75. After x exceeds 75, the vibration becomes weaker as x increases and is stopped when x is 95. Whether or not the bend amount x has reached 75 is then judged (S115). When x has not reached 75 (S115: N), whether x satisfies $55 \leq x < 75$ or not is judged (S116). When $55 \leq x < 75$ is satisfied (S116: Y), S115 is executed again. If not (S116: N), since x has not reached 75 and not within the range $55 \leq x < 75$, x is judged as smaller than 55, and the vibrator 120a is stopped (S117) before the processing returns to S113.

When it is judged in S115 that x has reached 75 (S115: Y), the vibrator 120a generates the $T_2$ forward crossing vibrations (S118). Whether or not x satisfies $75 \leq x$ is judged next (S119) and, when the answer is N (S119: N), the vibrator 120a generates the $T_2$ reverse crossing vibrations before the processing returns to Step S115.

When it is judged in S119 that $75 \leq x$ is satisfied (S119: Y), whether x has reached 95 or not is judged (S121). When x has not reached 95 (S121: N), the processing returns to S119. When x has reached 95 (S121: Y), the vibrator 120a stops vibrating (S122). Whether or not x satisfies $95 \leq x$ is judged next (S123) and, when $95 \leq x$ is not satisfied (S123: N), the vibration is resumed (S124) before the processing returns to S119. When it is judged in S123 that $95 \leq x$ is satisfied (S123: Y), S123 is executed again.

As described above, having the processor 118 detect the bend amount x and control the vibrator 120a in accordance with the detected value makes it possible to accurately inform the user 102 about whether or not the bend amount x corresponding to the bend amount of the manipulation portion 112a has reached the threshold $T_1$ or $T_2$.

In particular, the user 102 can quantitatively recognize from the level of vibration how close the present bend amount is to the threshold $T_1$ since the vibration becomes stronger as the bend amount of the manipulation portion 112a approaches the threshold $T_1$ as shown in the graph of FIG. 6(b) which illustrates the vibration level in relation to the bend amount. The user 102 can also recognize the occurrence of $T_1$ forward crossing from $T_1$ forward crossing vibrations generated by the vibrator 120a at the threshold $T_1$. The same applies to the threshold $T_2$ and $T_2$ forward crossing vibrations.

Furthermore, the vibrations in the areas B1, B2, B3 and B4, the $T_1$ forward crossing vibrations, the $T_1$ reverse crossing vibrations, the $T_2$ forward crossing vibrations, and the $T_2$ reverse crossing vibrations may be different from one another. From these vibrations, the user 102 can thus know which one of the areas B1, B2, B3 and B4 the present bend amount of the manipulation portion 112a is in, and whether or not forward crossing and reverse crossing has occurred at the threshold $T_1$ and the threshold $T_2$. The areas A1, C, and A2 in which no vibrations are generated are respectively an area where the manipulation portion 112a is hardly bent, an area where the manipulation portion 112a is bent halfway, and an area where the manipulation portion 112a is bent almost completely, and are easily discriminated from one another. The user 102 can readily know from how much the fingers are bent, the presence or absence of vibrations, and the type of vibration, which of the areas A1, C, and A2 the bend amount of the manipulation portion 112a is in.

Described next are algorithms of the data processing that is executed in the processor 118 of the input device 100.

Algorithm 1

In this algorithm, when forward crossing and reverse crossing are made at each of the threshold $T_1$ and the threshold $T_2$ the processor 118 generates a signal indicating the forward crossing or the reverse crossing, and inputs the generated signal as it is in the game machine 108 via the receiver 106.

Specifically, when the detected bend amount x increases from a value smaller than 25 and exceeds $T_1$ (where the bend amount is 25), the processor 118 generates a signal that indicates the occurrence of $T_1$ forward crossing. When the bend amount x decreases from a value larger than 25 and becomes smaller than $T_1$, the processor 118 generates a signal that indicates the occurrence of $T_1$ reverse crossing. The forward crossing signal and the reverse crossing signal are entered in the game machine 108 via the receiver 106.

When the bend amount x increases from a value smaller than 75 and exceeds $T_2$ (where the bend amount is 75), the processor 118 generates a $T_2$ forward crossing signal. The processor 118 inputs this signal to the game machine 108 via the receiver 106.

When the bend amount x decreases from a value larger than 75 and becomes smaller than $T_2$, the processor generates a $T_2$ reverse crossing signal, and inputs this signal to the game machine 108 via the receiver 106.

The game machine 108 detects the forward crossing signal and reverse crossing signal of the threshold $T_1$ and the forward crossing signal and reverse crossing signal of the threshold $T_2$, and in response to these input signals, operates as described in the following Operation Example 1.

OPERATION EXAMPLE 1

In this example, Algorithm 1 is used and the input device 100 is operated as an entertainment device controller that has two buttons, Button 1 and Button 2.

Specifically, the forward crossing signal and reverse crossing signal of the threshold $T_1$ in the manipulation portion 112a of the input device 100 are respectively associated with On (i.e., the action of pressing the button) and Off (i.e., the action of releasing the button) of Button 1 of the controller. The forward crossing signal and reverse crossing signal of the threshold $T_2$ in the manipulation portion 112a of the input device 100 are respectively associated with the action of pressing Button 1 plus Button 2 of the controller and the action of releasing Button 2 of the controller while keeping Button 1 depressed.

The forward crossing signal and reverse crossing signal of the threshold $T_1$ in the manipulation portion 112b of the input device 100 are respectively associated with On (i.e., the action of pressing the button) and Off (i.e., the action of releasing the button) of Button 2 of the controller.

With this configuration, button inputs are made by using the input device 100 as an entertainment device controller that has two buttons.

The forward, backward, left, and right directions may be associated with four-way navigation inputs of a four-way scroll key by having the acceleration sensor 122 of the input device 100 detect the tilt of the input device 100 in the forward, backward, left, and right directions with respect to a horizontal plane from the initial state of the input device 100. Then the input device 100 can be used as a controller that is commonly used in entertainment devices to make a direction input and a button input. The input device 100 in this case can be used as a controller that has an arbitrary number of buttons by suitably allocating the forward crossing signal and the reverse crossing signal at $T_1$ or $T_2$ of arbitrary manipulation portions 112 to controller buttons.

Forward crossing signals and reverse crossing signals can be associated arbitrarily with On and Off of buttons. For example, three values, Off, Weak and Strong are allocated to one button, and it is judged that a weak input is made when the bend amount exceeds a first threshold whereas it is judged that a strong input is made when the bend amount exceeds a second threshold which is larger than the first threshold.

Algorithm 2

Algorithm 1 has a possibility of leading to a result that is not intended by the user 102, for example, when the intention of the user 102 is to turn Button 1 off immediately after turning it on, an input disturbance near $T_1$ could cause Button 1 to be turned on and off several times before finally being turned off.

In particular, since the input device 100 in this embodiment uses the vibrator 120a to vibrate the manipulation portion 112a, the vibration of the vibrator 120a can cause minute increases and decreases in bend amount near $T_1$ or $T_2$ against the intention of the user 102. This could lead to a result that is not intended by the user 102.

Algorithm 2 makes sure that the intention of the user 102 is reflected truly by judging that there is an input when a reverse crossing signal is detected as shown in the following Operation Examples 2 and 3.

OPERATION EXAMPLE 2

This operation example is an application of Operation Example 1 in Algorithm 1, and it is judged that an input is made when transmission of the $T_1$ reverse crossing signal or the $T_2$ reverse crossing signal from the input device 100 to the game machine 108 is detected.

As in Operation Example 1, the input device 100 inputs the $T_1$ reverse crossing signal, the $T_1$ forward crossing signal, the $T_2$ forward crossing signal, and the $T_2$ reverse crossing signal to the game machine 108. The game machine 108 judges that an input is made not when the $T_1$ forward crossing signal or the $T_2$ forward crossing signal is entered but when the $T_1$ reverse crossing signal or the $T_2$ reverse crossing signal is entered. The game machine 108 performs game processing in accordance with the $T_1$ reverse crossing signal or $T_2$ reverse crossing signal entered. For instance, a character in the game is manipulated with the input device 100 and, when the $T_1$ reverse crossing signal is entered from the input device 100, the character is made to jump a short distance (low jump) whereas the character is made to jump a long distance (high jump) when the $T_2$ reverse crossing signal is entered.

In this example, when the manipulation portions 112 are to be returned directly to the initial state where the bend amount of the manipulation portions 112 is 0 after the $T_2$ reverse crossing signal is entered, the state in which the bending amount is 25 is passed in the process of returning the manipulation portions 112 to the initial state. An input of the $T_1$ reverse crossing signal in this process is unavoidable, and it will be against the intention of the user 102 in some cases. This operation example solves the inconvenience by treating the $T_1$ reverse crossing signal that is entered successively to the $T_2$ reverse crossing signal as an invalid signal.

In another mode, to solve this inconvenience, "processing according to the $T_2$ reverse crossing signal" is performed not when the $T_2$ reverse crossing signal is entered but when the $T_1$ reverse crossing signal is entered after the $T_2$ reverse crossing signal. In this mode, when the $T_1$ reverse crossing signal is entered, whether or not the input of this $T_1$ reverse crossing signal follows an input of the $T_2$ reverse crossing signal is judged and, if the answer is "no", "processing according to the $T_1$ reverse crossing signal" is performed whereas "processing according to the $T_2$ reverse crossing signal" is performed in other cases.

OPERATION EXAMPLE 3

In Operation Example 2 described above, all the forward crossing signals and reverse crossing signals of $T_1$ and $T_2$ are transmitted from the input device 100. Operation Example 3 shows an example of inputting a first signal and a second signal from the input device 100 to the game machine in response to generation of the $T_1$ reverse crossing signal and the $T_2$ reverse crossing signal.

Figure 9:
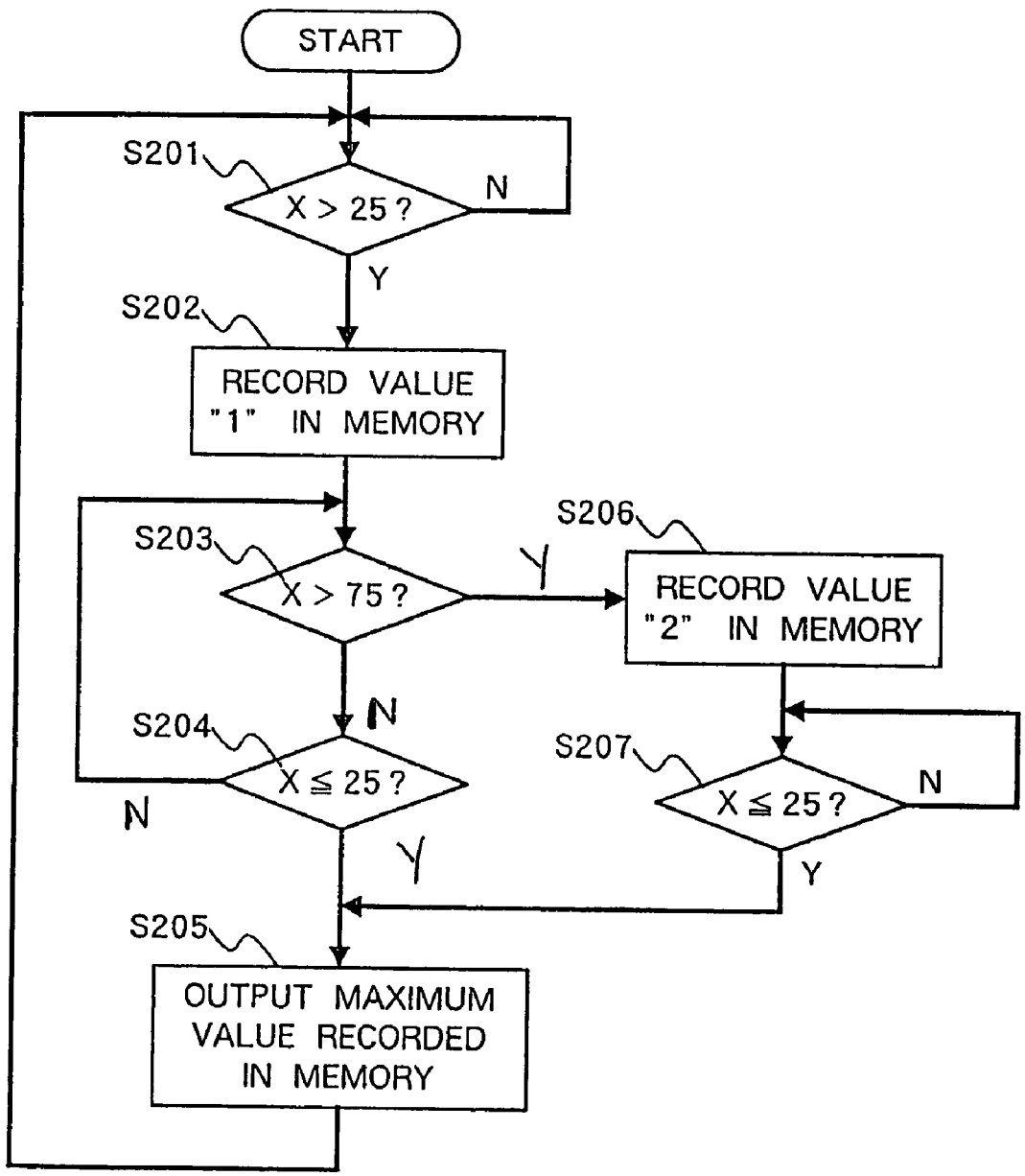
FIG. 9 is a flow chart showing details of processing executed by a processor.

This algorithm is described below with reference to a flow chart of FIG. 9.

The input device 100 in this example has a memory that is accessible to the processor 118. The processor 118 judges whether or not the bend amount x is larger than the threshold $T_1$=25 (S201). When the bend amount x is not larger than 25 (S201: N), the processing returns to S201. When the bend amount x is larger than 25 (S201: Y), a given value that corresponds to the first signal mentioned above, "1", in this example, is recorded in the memory of the input device 100 (S202). Thereafter, whether or not the bend amount x is larger than the threshold $T_1$=75 is judged (S203) and, when the bend amount x is not larger than 75 (S203: N), whether or not the bend amount x is equal to or smaller than 25 is judged (S204). In the case where the bend amount x is not equal to or smaller than 25 (S204: N), the processing returns to S203. In other cases (S204: Y), the processor 118 reads, as an output value, the maximum value that is recorded in the memory, here, the value "1" (S205), and outputs the first signal to the game machine 108 through the receiver 106.

When it is judged in S203 that x has reached 75 (S203: Y), a signal value corresponding to the second signal, in this example, a value "2", is recorded in the memory (S206), and whether or not x has returned to 25 is then judged (S207). When x has not returned to 25 (S207: N), S207 is executed again. When x has returned to 25 (S207: Y), the processing proceeds to S205 where the processor 118 reads the maximum value recorded in the memory, here, the value "2", and outputs the second signal to the game machine 108 through the receiver 106.

In the above-mentioned algorithm, the output value "1" or "2" is read out of the processor 118 upon the return of the bend amount x to the threshold $T_1$ from a value larger than $T_1$, to thereby output first information or second information to the game machine 108.

The first information and the second information in this operation example are both sent by the action of returning the manipulation portion 112a from a bent state to the initial state. This action is accomplished by the resilience of the manipulation portion 112a. The user 102 therefore does not need to adjust the force of gripping the manipulation portion 112a, which is a manipulation requiring accuracy. Instead, merely relaxing the fingers and letting the elasticity of the manipulation portion 112a provide resilience are enough to output the first information and the second information. Thus the processor 118 outputs the first information and the second information at timing intended by the user 102.

The values "1" and "2" are recorded in the memory in this operation example. Alternatively, values recorded in the memory may be updated. In this case, values recorded in the memory are updated only when a button is pressed that is associated with a larger bend amount than any recorded value which is associated with a button.

Even when the intention of the user 102 is to set the bend amount x of the manipulation portions 112 equal to or smaller than 75, the bend amount x of the manipulation portions 112 could be made larger than 75 by mistake or the like. If the accidentally set value of the bend amount x is within the area A2 shown in FIG. 6, namely, 95 or larger, the $T_2$ reverse crossing signal may not be generated upon the subsequent return of the bend amount x to a value equal to or smaller than 75. This is to negate the outcome of setting the bend amount x to a value larger than 75 by mistake by bending the manipulation portions 112 deeply until the bend amount x exceeds 95 and thus canceling the $T_2$ reverse crossing signal. The area A2 in this case serves as a manipulation mistake cancellation area.

This method of canceling out a manipulation mistake by providing a cancellation area is applicable to cases where an input is made in response to reverse crossing signals as in Operation Example 3. For instance, a manipulation mistake can be cancelled out by providing a cancellation area in the above-described Operation Example 2 and the following Operation Example 4 where an input is made in response to reverse crossing signals.

OPERATION EXAMPLE 4

Figure 10:
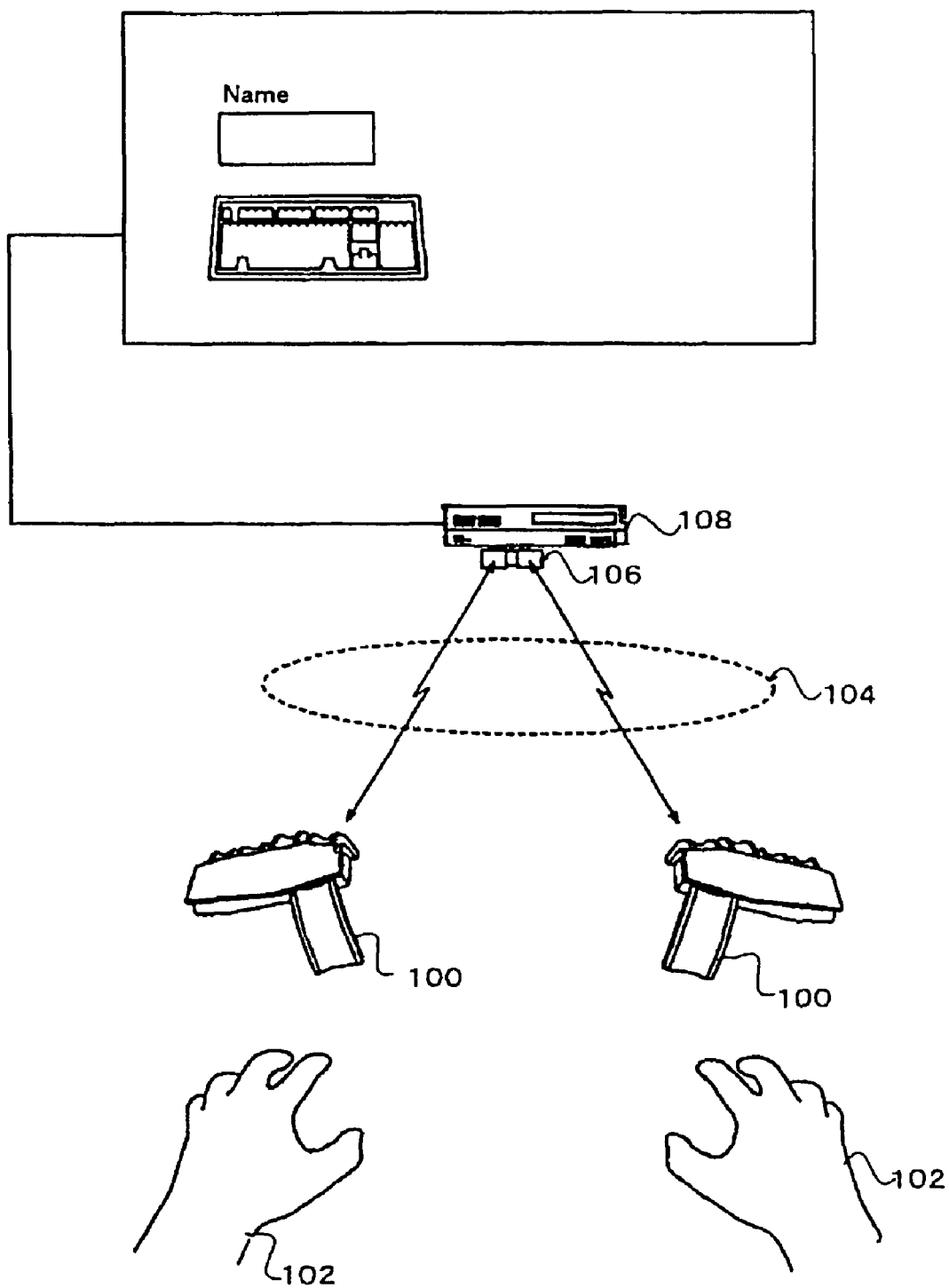
FIG. 10 is an explanatory diagram of an input example in which a keyboard is displayed on the display.

Algorithm 2 may be applied such that the input device 100 is used as a keyboard. In Operation Example 4, a keyboard is displayed on the game machine 108 and characters are entered in a given character input field as shown in FIG. 10. One input device 100 is manipulated with the right hand while another input device 100 is manipulated with the left hand, and these two input devices 100 are used as a keyboard.

The right hand side input device 100 allocates "a" to the $T_1$ reverse crossing signal of the manipulation portion 112a, "i" to the $T_1$ reverse crossing signal of the manipulation portion 112b, "u" to the $T_1$ reverse crossing signal of the manipulation portion 112c, "e" to the $T_1$ reverse crossing signal of the manipulation portion 112d, and "o" to the $T_1$ reverse crossing signal of the manipulation portion 112e.

The left hand side input device 100 allocates "k" to the $T_1$ reverse crossing signal of the manipulation portion 112a, "s" to the $T_2$ reverse crossing signal of the manipulation portion 112a, "t" to the $T_1$ reverse crossing signal of the manipulation portion 112b, "n" to the $T_2$ reverse crossing signal of the manipulation portion 112b, "h" to the $T_1$ reverse crossing signal of the manipulation portion 112c, "m" to the $T_2$ reverse crossing signal of the manipulation portion 112c, "y" to the $T_1$ reverse crossing signal of the manipulation portion 112d, "r" to the $T_2$ reverse crossing signal of the manipulation portion 112d, and "w" to the $T_1$ reverse crossing signal of the manipulation portion 112e.

This configuration makes it possible to enter Japanese in the Roman alphabet by combining a vowel with a consonant. A key of the displayed keyboard, which is entered from the input device 100, may be highlighted, so that the user can enter characters while checking which key has been activated.

Taken as an example is a case in which a name "Sato" is entered in a name input field displayed above the graphically displayed keyboard in FIG. 10. The user 102 enters "s" by inputting the $T_2$ reverse crossing signal from the manipulation portion 112a of the left hand side input device 100. As this reverse crossing signal is entered, an "s" key of the keyboard shown in FIG. 10 is highlighted. The user can thus confirm that the "s" key has been activated from the highlighted display of the key on the screen, in addition to the vibration of the vibrators 120a to 120g of the input device 100. In this example, a key is highlighted for a given period of time (e.g., 0.5 second) and then displayed normally since keeping a key highlighted means that the key is already highlighted when the same key is to be activated again. The user 102 can thus confirm that "s" has correctly been entered from the input device 100.

Thereafter, the user 102 inputs the $T_1$ reverse crossing signal from the manipulation portion 112a of the right hand side input device 100, the $T_1$ reverse crossing signal from the left hand side manipulation portion 112b, the $T_1$ reverse crossing signal from the right hand side manipulation portion 112e, and the $T_1$ reverse crossing signal from the manipulation portion 112c of the right hand side input device 100 in the order stated, thereby entering "a", "t", "o" and "u" from the input device 100 in the order stated. As the characters are entered, "a", "t", "o" and "u" keys of the graphically displayed keyboard of FIG. 10 are highlighted in this order.

The input device 100 can be used not only as a keyboard for game machines but also as a keyboard for computers such as personal computers and servers. Alphabet keys, number keys, shift keys and other keys in a computer keyboard are respectively allocated to $T_1$ reverse crossing signals of the input device 100 or combinations of $T_1$ reverse crossing signals of the input device 100 (for example, an "F1" key of the keyboard is allocated to "simultaneous input of the $T_1$ reverse crossing signal of the manipulation portion 112a and the $T_1$ reverse crossing signal of the manipulation portion 112b in the input device 100"). The input device 100 can thus be used as a computer keyboard.

Shown below is an example in which the input device 100 is used as a computer keyboard such as a 106-key keyboard.

In this example, the input device 100 is gripped with the back of the hand kept approximately horizontal in the initial state. The amount of displacement of the input device 100, which is caused by manipulation by the user 102, from this initial state is detected by the acceleration sensor 122, and the processor 118 obtains a tilt angle of the input device 100 from the detected displacement amount. The processor 118 judges, from the tilt angle and the above $T_1$ reverse crossing signals, which key of the keyboard has been activated by the input device 100.

Which row of the 106-key keyboard is to be activated is determined from the tilt angle about the x-axis of the input device 100 with respect to the initial state by setting the vertical direction as the z-axis, the forward-backward direction viewed from the user 102 as the y-axis, and the left-right direction viewed from the user 102 as the x-axis. A 106-key keyboard in general places function keys in the first row, a "single-byte/double-byte" key and number keys (1, 2, 3 . . . ) in the second row, a "tab" key and the first row of alphabet keys (q, w, e, r, t, y . . . ) in the third row, an "alpha-numeral" key and the second row of alphabet keys (a, s, d, f, g . . . ) in the fourth row, "shift" keys and the third row of alphabet keys (z, x, c, v, b . . . ) in the fifth row, and a "control" key, a "Windows key", "alt" keys, a "no convert" key, and a "space" key in the sixth row.

A 106-key keyboard is thus usually composed of six rows. A suitable threshold is set for the forward tilt angle of the input device 100, and which row of the keyboard is to be activated is determined from how much the input device 100 is tilted about the x axis.

In this example, it is determined that the first row of the 106-key keyboard is to be activated when the input device 100 is tilted downward by more than 20° (the maximum forward tilt) with respect to a horizontal plane. The second row of the 106-key keyboard is to be activated when the input device 100 is tilted downward by 20° to 10° with respect to the horizontal plane. The third row of the 106-key keyboard is to be activated when the input device 100 is tilted downward by 10° with respect to the horizontal plane, is horizontal, and in between. The fourth row of the 106-key keyboard is to be activated when the input device 100 is horizontal, is tilted upward by 10° with respect to the horizontal plane, and in between. The fifth row of the 106-key keyboard is to be activated when the input device 100 is tilted upward by 10° to 20° with respect to the horizontal plane. The sixth row of the 106-key keyboard is to be activated when the input device 100 is tilted upward by more than 20° with respect to the horizontal plane.

For each row of the 106 keyboard, the association is set between a key to be activated and the right-left tilt of the input device 100, in other words, the right-left tilt angle of the input device 100 about the y-axis. Only the input device 100 gripped in the right hand is to be used for key input, and the input device 100 is tilted by an angle equal to or larger than a given angle, in this embodiment, 10° or more to the left. Then, in each row of the keyboard, the leftmost key is associated with the $T_1$ reverse crossing signal from the manipulation portion 112a that corresponds to the right hand thumb, the second key from the left is associated with the $T_1$ reverse crossing signal from the manipulation portion 112b that corresponds to the right hand forefinger, . . . , and the fifth key from the left is associated with the $T_1$ reverse crossing signal from the manipulation portion 112e that corresponds to the right hand little finger.

When the tilt angle of the input device 100 is less than 10° to the left or to the right, in each row of the keyboard, the sixth key from the left is associated with the $T_1$ reverse crossing signal from the manipulation portion 112a, the seventh key from the left is associated with the $T_1$ reverse crossing signal from the manipulation portion 112b, . . . . , and the tenth key from the left is associated with the $T_1$ reverse crossing signal from the manipulation portion 112e.

When the tilt angle of the input device 100 is 10° or more to the right, in each row of the keyboard, the eleventh key from the left is associated with the $T_1$ reverse crossing signal from the manipulation portion 112a, the twelfth key from the left is associated with the $T_1$ reverse crossing signal from the manipulation portion 112b, . . . , and the fifteenth key from the left is associated with the $T_1$ reverse crossing signal from the manipulation portion 112e.

By setting the input device 100 in the manner described above, key input similar to the one made by a keyboard can be accomplished with one input device 100. For instance, to enter "y" through the input device 100, the $T_1$ reverse crossing signal is entered from the manipulation portion 112b while the input device 100 is held at an angle between 10° downward and horizontal about the x-axis with respect to a horizontal plane and tilted to the left or right about the y-axis by an angle smaller than 10°, since "y" in the 106-key keyboard is the seventh key from the left in the third row (i.e., the row where the "tab", "q", "w", "e", "r", "t" keys are located).

Key input made by the user may be assisted by a character input control unit provided in the computer or the game machine (or in the input device 100 if the input device 100 is specially made for the game machine or the computer). The character input control unit receives an input from the input device 100, in this example, inputs from the bend sensors 114a to 114e and from the acceleration sensor 122, and changes the graphical display of the keyboard in accordance with the received input. The character input control unit (not shown) can be built as software in the form of a driver of the input device 100 or the like.

In Operation Example 4, a key to be activated is specified by the state of the input device 100, for example, the tilt angle with respect to the horizontal plane. The character input control unit may change the graphical display on the screen. Preferably, keys that can be activated by the input device 100 in the present state are highlighted by, for example, a reverse display, so that the user can be informed of keys that can be activated in accordance with the state of the input device 100.

In this example, which row of the keyboard is to be activated is determined from the tilt angle about the x-axis and the tilt angle about the y-axis of the input device 100 as described above. The character input control unit calculates these tilt angles from the input of the acceleration sensor 122, and displays in a highlighted manner keys of the keyboard that can be activated.

For instance, when the tilt angle of the input device 100 about the x-axis is 10° to 20° upward with respect to the horizontal plane whereas the tilt angle of the input device 100 about the y-axis is less than 10° to the left or right as described above, the sixth to tenth keys from the left in the fifth row of the keyboard can be activated. In this state, the sixth to tenth keys from the left in the fifth row of the keyboard are displayed in a highlighted manner. The keys that are displayed in a highlighted manner here would be the "b", "n", "m", ",", "." keys in a typical 106-key keyboard.

As an alternative way of assisting key input to displaying a keyboard on the screen, inline input may be employed in which characters that can be entered are displayed in a place where a character is actually entered.

In this case, when the tilt angle of the input device 100 about the x-axis is 10° to 20° upward with respect to the horizontal plane whereas the tilt angle of the input device 100 about the y-axis is less than 10° to the left or right as described above, the characters "b", "n", "m", "," and "." are displayed as input candidates in a place where a character is entered. If an input is received in this state from the manipulation portion 112b that corresponds to the right hand forefinger, "n", which is the seventh key from the left, is displayed as an input candidate.

Displaying an input candidate before a forward crossing signal is generated enables the user to check which key is about to be activated by his/her manipulation. If the displayed key, here, "n", is the desired key, the user further bends the manipulation portion 112b to generate the $T_1$ forward crossing signal, and then returns the manipulation portion 112b to the stretched state to generate the $T_1$ reverse crossing signal, thereby actually entering "n". The input of "n" can be cancelled after the $T_1$ forward crossing signal is generated by bending the manipulation portion 112b until the area A2 where the bend amount x is 95 or larger is reached.

In the above operation examples and the following operation examples, if it suits the need, the input device 100 may be provided with a recording unit (e.g., ROM) or. a memory (e.g., RAM) to record the association between a key of the keyboard and a posture of the input device 100 or input from the manipulation portions 112a to 112e, so that an algorithm such as Algorithm 2 or 3 is executed in the input device 100. This eliminates the need for the game machine or the computer to run software or a driver for executing the algorithm. For instance, in Operation Example 4, the association between keys and the $T_1$ reverse crossing signal and $T_2$ reverse crossing signal of each of the right hand and left hand manipulation portions 112a to 112e which depends on the tilt angle of the input device 100 may be recorded in a ROM in advance, so that the processor 118 outputs a signal indicating a key that corresponds to a combination of the tilt angle of the input device 100 and input from the manipulation portions 112a to 112e. In this way, the input device 100 can be used as a general-purpose keyboard without using special software or driver.

Algorithm 3

Algorithm 3 associates the $T_1$ forward crossing signal and the $T_1$ reverse crossing signal according to the bend amount of the manipulation portion 112a with On and Off of Button 1, respectively. Similarly, the $T_1$ forward crossing signals and $T_1$ reverse crossing signals of the manipulation portions 112b to 112e are respectively associated with On and Off of Buttons 2 to 4. The motion of the input device 100 is detected by the processor 118 via the acceleration sensor 122, and a specific command is executed accordingly. An operation example thereof is given below.

OPERATION EXAMPLE 5

In this example, when the input device is moved, tilted, swiveled, or the like through manipulation by the user 102, the amount of the displacement is detected by the acceleration sensor 122 and the processor 118 processes the displacement amount. As in the examples for Algorithm 2, the input device 100 is provided with a memory that is accessible to the processor 118, and several commands executable by the processor 118 may be recorded in the memory.

The processor 118 detects, as the displacement amount of the input device 100, the tilt amount of the input device 100 with respect to an initial state in which the input device 100 is gripped by the user 102. At least one of the recorded commands is executed when the tilt of the input device 100 is equal to or larger than a given value.

More specifically, the vertical direction is set as the z-axis, the forward-backward direction viewed from the user 102 is set as the y-axis, and the left-right direction viewed from the user 102 is set as the x-axis. The input device 100 is first gripped by the user 102 and then tilted to the left (i.e., the input device 100 is rotated about the y-axis to the left viewed from the user 102). When this tilt angle is judged as equal to or larger than a given value by the processor 118, the commands mentioned above are executed.

Examples of the commands include one for allocating Button 1 to Button 5 to the manipulation portions 112a to 112e, respectively, and activating several specific buttons to be processed together.

In this example, when the input device 100 is tilted to the left by 40° or more from the position where the input device 100 is first gripped by the user 102, Button 1 to Button 5 of the manipulation portions 112a to 112e are all activated to be processed together based on the condition of one of the buttons. If there is a change in state in one of the thus activated buttons, the change is reflected on all the rest of the buttons of the manipulation portions 112a to 112e.

More specifically, when the generation of the $T_1$ forward crossing signal is associated with the operation of turning the button on and the generation of the $T_1$ reverse crossing signal is associated with the operation of turning the button off in each manipulation portion, if the generation of the $T_1$ forward crossing signal turns on the button that corresponds to one of the manipulation portions 112a to 112e after Button 1 to Button 5 are activated as described above, (i.e., the input device 100 is tilted to the left by 40° or more)the buttons of all the manipulation portions 112 are simultaneously turned on (in other words, it is deemed that the $T_1$ forward crossing signals are generated in all the manipulation portions 112a to 112e at once). If the generation of the $T_1$ reverse crossing signal turns off the button that corresponds to one of the manipulation portions 112a to 112e after Button 1 to Button 5 are activated as described above, the buttons of all the manipulation portions 112 are simultaneously turned off (in other words, it is deemed that the $T_1$ reverse crossing signals are generated in all the manipulation portions 112a to 112e at once).

A specific vibrator may be vibrated when the buttons are activated in order to inform the user 102 of the fact that Button 1 to Button 5 allocated to the manipulation portions 112a to 112e, respectively, are all activated to be processed together. In this example, one of the vibrators 120f and 120g that is to the left of the user 102 (in the case of the right hand input device 100 shown in FIG. 3, for example, the vibrator 120g) is vibrated to ensure that the user 102 is aware of the activation of the buttons to be processed together.

An input operation difficult for the user 102, such as bending only the third and little fingers, may be recorded as a command in the memory, and the user 102 may have the processor 118 execute this command by performing an input operation easy for the user 102, such as tilting the input device 100 as described above. In this way, a difficult input operation can be, executed through a simple operation.

In another mode, input switching may be made for each different posture of the input device 100 detected. For example, a state shown in FIG. 1 in which the user 102 holds the input device 100 substantially parallel to a horizontal plane with the back of his/her hand facing skyward is defined as a "horizontal position", a state in which the user 102 holds the input device 100 with the back of his/her hand perpendicular to the horizontal plane is defined as a "vertical position", and a state in which the user 102 holds the input device 100 with the back of his/her hand facing downward is defined as a "flipped position". The allocation of buttons to the manipulation portions 112a to 112e can be varied among the horizontal position, the vertical position and the flipped position.

Algorithm 4

In this example, the motion of the input device 100 is detected by the acceleration sensor 122 and, when the processor 118 judges that the input device 100 has made a specific motion, the state of a specific button is changed. An example thereof is given below.

OPERATION EXAMPLE 6

In this example, when the processor 118 judges from the motion of the input device 100 detected by the acceleration sensor 122 that the input device 100 has been swung to the left, Button 1 of the manipulation portion 112a is turned on and a signal is entered to the game machine 108 via the receiver 106 to indicate that Button 1 allocated to the manipulation portion 112a has been turned on. Similarly, when the processor 118 judges that the input device 100 has been swung to the right, Button 2 allocated to the manipulation portion 112b is turned on. When the processor 118 judges that the input device 100 has been swiveled to the left, Button 3 allocated to the manipulation portion 112c is turned on and, when it is judged that the input device 100 has been swiveled to the right, Button 4 allocated to the manipulation portion 112d is turned on. After that, corresponding signals are entered in the game machine 108 via the receiver 106.

As has been described, this embodiment provides an input device that is easy to use for the user 102. The input device according to this embodiment is capable of detecting the motion of a hand of the user 102 and is also suitable for digital data input.

The above-mentioned operation examples are shown for exemplification purposes, and forward crossing signals and reverse crossing signals from the manipulation portions can freely be associated with keys, buttons, function keys, and the like of a device that receives input from the input device 100. The number and operation of such keys, buttons and function keys can be set arbitrarily.

The input device can serve as an input device for an arbitrary device other than a controller for game machines and a keyboard for computers as those described above. For instance, the input device can be used as a remote controller for TV, VCR and other home electric appliances.

The input device in this embodiment is a handheld type device, which is gripped in a hand of the user 102, and is not the type that houses a hand of the user 102 while in use like data gloves. However, it is possible to shape the input device like a glove or to configure the device to otherwise be fastened to a user's hand (e.g., a strap), although it gives the input device a larger size. In this embodiment, manipulation portions of the input device 100 are gripped by a hand of the user 102 and the elasticity of the manipulation portions (plus friction of the manipulation portions against the fingers and the palm, and the like) enables the user 102 to hold the input device 100 without dropping. If the input device 100 is shaped like a glove to be worn by the user 102 while in use as described above, or if means to fix the manipulation portions to the fingers of the user 102 is provided, the manipulation portions may be formed of a material without enough resilience to return to the original shape after bent by the user 102, for example, a lead plate.

The processor 118 may control the game machine 108 such that a speaker outputs sounds unique to the individual vibrations including the vibrations in the areas B1 to B4 and vibrations generated when the buttons allocated to the manipulation portions 112a to 112e are turned on, or such that graphics unique to those respective vibrations are displayed on a display. In this case, even if the different types of vibrations mentioned above all vibrate in the same way, the user 102 can recognize, from the sound or the display on the screen, an area or On or Off of a button that is associated with the currently generated vibrations.

The invention claimed is:

1. An input device for transmitting information comprising:
  a manipulation portion configured to be displaced by deformation by the user;
  a sensor for detecting a displacement amount of the manipulation portion;
  a vibration element for generating vibrations that are transmitted to the user; and
  a controller configured to control the vibration element to generate vibrations in accordance with information indicative of the displacement amount of the manipulation portion detected by the sensor, when $v_1 \leqq x \leqq T_1$ is satisfied, where x represents the displacement amount, $T_1$ represents a first threshold, and $v_1$ is a predetermined value less than $T_1$, the controller controls the vibration element to generate vibrations such that the vibrations become stronger as the displacement amount increases and when the displacement amount x has reached $T_1$, from a value smaller than $T_1$, the controller generates a forward crossing signal which indicates that the displacement amount x has reached $T_1$ from a value smaller than $T_1$ for inputting the forward crossing signal to a predetermined apparatus, or when the displacement amount x has returned to $T_1$ from a value larger than $T_1$, the controller generates a reverse crossing signal which indicates that the displacement amount x has returned to $T_1$ from a value larger than $T_1$ for inputting the reverse crossing signal to the predetermined apparatus.

2. An input device according to claim 1, further comprising a plurality of elastically deformable manipulation portions configured to be gripped by a user with his/her fingers, and wherein the manipulation portions enable the user to hold the input device without dropping the input device by gripping the manipulation portions with his/her fingers.

3. An input device according to claim 1, further comprising: means for detecting a displacement amount of the input device as the input device is moved through manipulation by the user; and a memory recording one or more commands that can be executed by the controller, wherein the controller selects and executes one or more commands recorded in the memory in accordance with the displacement amount detected by the means for detecting the displacement amount of the input device.

4. An input device which can be gripped by a user, for inputting information to a given apparatus, comprising:
   a manipulation portion which can be manipulated and displaced by the user;
   a sensor for detecting a displacement amount of the manipulation portion;
   a vibration means for generating vibrations that are transmitted to the user; and
   a control means which makes the vibration means generate vibrations in accordance with information indicative of the displacement amount of the manipulation portion detected by the sensor,
   when $v_1 \leqq x \leqq T_1$ is satisfied, where x represents the displacement amount, $T_1$ represents a first threshold, and $v_1$ is a predetermined value less than $T_1$, the controller controls the vibration element to generate vibrations such that the vibrations become stronger as the displacement amount increases and when the displacement amount x has reached $T_1$, from a value smaller than $T_1$, the controller generates a forward crossing signal which indicates that the displacement amount x has reached $T_1$ from a value smaller than $T_1$ for inputting the forward crossing signal to a predetermined apparatus, or
   when the displacement amount x has returned to $T_1$ from a value larger than $T_1$, the controller generates a reverse crossing signal which indicates that the displacement amount x has returned to $T_1$ from a value larger than $T_1$ for inputting the reverse crossing signal to a predetermined apparatus.

5. An input device according to claim 4, further comprising a plurality of thresholds, and wherein the controller controls the vibration element to generate vibrations such that the vibrations become stronger as the displacement amount approaches the most proximate threshold and the vibrations become weaker as the displacement amount moves away from the most proximate threshold.

6. An input device according to claim 5, wherein the controller controls the vibration element to generate vibrations such that vibrations generated in proximity of one of the thresholds differ from vibrations generated in proximity of another of the thresholds.

7. An input device according to claim 5, wherein the controller detects a largest threshold that the displacement amount reaches, and wherein when the displacement amount returns to the lowest threshold, the controller transmits information corresponding to the largest threshold reached.

8. An input device according to claim 4, wherein the generated vibrations are first vibrations, and wherein when the displacement amount returns to the threshold from a value larger than the threshold, the controller controls the vibration element to generate second vibrations that are different from the first vibrations.

9. An input device according to claim 8, wherein when the displacement amount reaches the threshold from a value smaller than the threshold, the controller controls the vibration element to generate third vibrations, which are different from the first vibrations.

10. An input device for transmitting information, comprising:
    a plurality of manipulation portions positioned such that a user can grip the manipulation portions with his/her fingers, the manipulation portions having elasticity which enables the user to manipulate and bend the manipulation portions, and to hold the input device without dropping the input device by gripping the manipulation portions with his/her fingers; and
    a motion detection sensor for detecting a motion of a hand of the user, wherein information about a motion of the user's hand detected by the motion detection sensor is transmitted,
    a vibration element for generating vibrations that are transmitted to the user,
    a controller configured to control the vibration element to generate vibrations in accordance with information indicative of a displacement amount of the manipulation portions detected by the sensor,
    wherein when the displacement amount x has reached $T_1$, from a value smaller than $T_1$, the controller generates a forward crossing signal which indicates that the displacement amount x has reached $T_1$ from a value smaller than $T_1$ for inputting the forward crossing signal to a predetermined apparatus, or
    when the displacement amount x has returned to $T_1$ from a value larger than $T_1$, the controller generates a reverse crossing signal which indicates that the displacement amount x has returned to $T_1$ from a value larger than $T_1$ for inputting the reverse crossing signal to a predetermined apparatus.

11. A method of inputting information through an input device, comprising:
    detecting a displacement amount of a movable portion of the input device; and
    transmitting vibrations to a user in accordance with the detected displacement amount, wherein when the displacement amount is smaller than a first threshold, the vibrations are transmitted such that the vibrations become stronger as the displacement amount increases, and when the displacement amount is larger than the first threshold, the vibrations are transmitted such that the vibrations become weaker as the displacement amount increases, generating a forward crossing signal, which indicates that the displacement amount has reached the first threshold from a value smaller than the first threshold, as input to a predetermined apparatus, when the displacement amount has reached the first threshold from a value smaller than the first threshold, or generating a reverse crossing signal, which indicates that the displacement amount has returned to the first threshold from a value larger than the first threshold, as input to the predetermined apparatus, when the displacement amount has returned to the first threshold from a value larger than the first threshold.

12. A method of inputting a character in a character input area that is displayed on a display, comprising:

detecting through a character input control unit an input made to the character input area by a user by displacing a movable portion of a character input device; and using the character input control unit to display, in the character input area, a character that is associated with the detected input, wherein when a displacement amount of the movable portion does not exceed a given threshold, the character input control unit presents a candidate for a character to be entered to the user through the display and, when the displacement amount exceeds the given threshold, the character candidate is actually entered, wherein when the displacement amount of the movable portion reaches the given threshold from a value smaller than the given threshold, the character input control unit generates a forward crossing signal, which indicates that the displacement amount has reached the given threshold from a value smaller than the given threshold, as input to a predetermined apparatus, or when the displacement amount of the movable portion returns to the given threshold from a value larger than the given threshold, the controller generates a reverse crossing signal, which indicates that the displacement amount has returned to the given threshold from a value larger than the given threshold, as input to the predetermined apparatus.

* * * * *